(12) United States Patent
Ohta

(10) Patent No.: US 9,711,779 B2
(45) Date of Patent: Jul. 18, 2017

(54) BATTERY

(71) Applicants: TOYOTA JIDOSHA KABUSHIKI KAISHA, Toyota-shi, Aichi (JP); Toyoko Ohta, Miyoshi-shi (JP)

(72) Inventor: Hiroshi Ohta, Miyoshi (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 273 days.

(21) Appl. No.: 14/409,099

(22) PCT Filed: Jun. 18, 2013

(86) PCT No.: PCT/JP2013/066652
§ 371 (c)(1),
(2) Date: Dec. 18, 2014

(87) PCT Pub. No.: WO2014/002819
PCT Pub. Date: Jan. 3, 2014

(65) Prior Publication Data
US 2015/0180007 A1 Jun. 25, 2015

(30) Foreign Application Priority Data
Jun. 29, 2012 (JP) .................................. 2012-146378

(51) Int. Cl.
*H01M 2/30* (2006.01)
*H01M 2/06* (2006.01)
(Continued)

(52) U.S. Cl.
CPC .............. *H01M 2/30* (2013.01); *H01M 2/04* (2013.01); *H01M 2/0473* (2013.01); *H01M 2/06* (2013.01); *H01M 2/22* (2013.01); *H01M 2/021* (2013.01); *H01M 2/024* (2013.01); *H01M 2/0212* (2013.01); *H01M 2/0217* (2013.01); *H01M 2/0277* (2013.01); *H01M 2/0482* (2013.01);
(Continued)

(58) Field of Classification Search
None
See application file for complete search history.

(56) References Cited

U.S. PATENT DOCUMENTS

2009/0087737 A1 4/2009 Yamauchi et al.
2013/0273418 A1 10/2013 Saito

FOREIGN PATENT DOCUMENTS

JP 2004253295 A 9/2004
JP 2009-087693 A 4/2009
(Continued)

*Primary Examiner* — Ula C Ruddock
*Assistant Examiner* — Matthew Van Oudenaren
(74) *Attorney, Agent, or Firm* — Andrews Kurth Kenyon LLP

(57) ABSTRACT

Before an insulation insertion part and/or an insulating contact part is compressed with a compression force, a first insulating member, a second insulating member, a case lid, and/or an insert-through part create a receiving space which allows the insulation insertion part to deform in a shape that reduces a compression stress acting on the insulation insertion part when the insulation insertion part is compressed and receive a deformed portion thereof, and/or a receiving space which allows an insulating member having the insulating contact part to deform in a shape that reduces a compression stress acting on the insulating contact part when the insulating contact part is compressed and receives the deformed portion thereof.

8 Claims, 29 Drawing Sheets

(51) Int. Cl.
*H01M 2/22* (2006.01)
*H01M 2/04* (2006.01)
*H01M 2/10* (2006.01)
*H01M 2/08* (2006.01)
*H01M 2/02* (2006.01)
*H01M 2/24* (2006.01)
*H01M 2/26* (2006.01)
*H01M 10/052* (2010.01)

(52) U.S. Cl.
CPC ............ *H01M 2/08* (2013.01); *H01M 2/1094* (2013.01); *H01M 2/24* (2013.01); *H01M 2/263* (2013.01); *H01M 10/052* (2013.01)

(56) References Cited

FOREIGN PATENT DOCUMENTS

| | | |
|---|---|---|
| JP | 2011-023235 A | 2/2011 |
| JP | 2012-028246 A | 2/2012 |
| JP | 2012-128961 A | 7/2012 |
| JP | 2012-221837 A | 11/2012 |
| WO | 2012/086031 A1 | 6/2012 | though only a sketch outline# BATTERY

CROSS-REFERENCE TO RELATED APPLICATIONS

This is a US national phase application based on the PCT International Patent Application No. PCT/JP2013/066652 filed on Jun. 18, 2013, and claiming the priority of Japanese Patent Application No. 2012-146378 filed on Jun. 29, 2012, the entire contents of which are herewith incorporated by reference.

TECHNICAL FIELD

The present invention relates to a battery.

BACKGROUND ART

Patent Document 1 discloses a battery including a box-shaped case body having an opening, an electrode body enclosed in the case body, a plate-shaped case lid closing the opening of the case body, and an electrode connecting member having a seat part located inside the case body, a columnar-shaped insert-through part protruding from an upper surface of the seat part and penetrating through a through hole of the case lid to the outside, and an electrode body connecting part extending from a lower surface of the seat part toward a bottom of the case body to electrically connect to the electrode body.

This battery further includes a first insulating member having an electrical insulating property, the first insulating member including a first interposed part interposed between the seat part and the lower surface of the case lid, an outer terminal member located outside the case body and an upper surface side of the case lid to electrically connect to the electrode connecting member, a second insulating member having an electrical insulating property and a second interposed part interposed between the outer terminal member and the upper surface of the case lid, and a fixing unit for fixing the second insulating member, case lid, and first insulating member held or clamped under compression force between the outer terminal member and the seat part. This fixing unit is constituted of a deformed part continuous with an end of an insert-through part of the electrode connecting member.

RELATED ART DOCUMENTS

Patent Documents

Patent Document 1: JP-A-2012-28246

To be concrete, the first insulating member (a gasket) has a cylindrical insulating insertion part inserted in the through hole of the case lid to surround the insert-through part of the electrode connecting member. This insulating insertion part is compressed in its axial direction by the compression force (caulking force) while a distal end of the insertion part is in contact with the insulating member. This ensures electric insulation between the case lid and the electrode connecting member.

SUMMARY OF INVENTION

Problems to be Solved by the Invention

Meanwhile, there is a demand for appropriate sealing between the seat part and the lower surface of the case lid by making the fixing unit (a deformed part) fix the second insulating member, case lid, and first insulating member held between the outer terminal member and the seat part under compression force, thereby compressing the first interposed part of the first insulating member.

To ensure insulation between a hole inner peripheral surface defining the through hole of the case lid and the insert-through part of the electrode connecting member, it is also demanded to reliably bring the distal end of the insulating insertion part in contact with the second insulating member. For this purpose, as shown in FIGS. 30 and 31, an insulating insertion part 775 is designed to be somewhat long (longer than the length of a through hole 713h of a case lid 713) in consideration of production errors of the case lid 713 and others.

Accordingly, when a second insulating member 780, the case lid 713, and a first insulating member 770 are held between an outer terminal member 737 and a seat part 731 and subjected to compression force (compression force acting in a vertical direction in FIGS. 30 and 31), the insulating insertion part 775 receives much of the compression force (large compression stress acts on the insulating insertion part 775), and a first interposed part 771 of the first insulating member 770 could not be appropriately compressed in some cases.

Specifically, since the length of the insulating insertion part 775 in the axial direction (the length along an axis AX) is longer than the length of the through hole 713h, before application of the compression force, a clearance Q is present between a second interposed part 783 of the second insulating member 780 and an upper surface 713p of the case lid 713 (see FIGS. 30 and 31). When the compression force is applied, accordingly, the insulating insertion part 775 is compressed by receiving the compression force. When this insertion part 775 is compressed down to the length of the through hole 713h, the second interposed part 783 of the second insulating member 780 comes to contact with the upper surface 713p of the case lid 713. After that, accordingly, the first interposed part 771 of the first insulating member 770 starts to be compressed through the second interposed part 783 and the case lid 713.

However, before the length of the insulating insertion part 775 becomes equal to the length of the through hole 713h, the insertion part 775 is in a state subjected to large compression stress (thereby generating large reaction force), the insertion part 775 could not be further compressed by the compression force (caulking force). Thus, the first interposed part 771 of the first insulating member 770 could not be compressed appropriately, which might cause insufficient sealing between the seat part 731 and the case lid 713. If the compression force is set larger to further compress the insulating insertion part 775 (to thereby appropriately compress the first interposed part 771 of the first insulating member 770), it may cause undesired deformation of the case lid 713 and others. Thus, this is not preferable.

Further, a portion of the second insulating member 780, referred to as an insulating contact part 783f, that contacts with the distal end of the insulating insertion part 775 is apt to receive much of the compression force (the compression stress acting on the insulating contact part 783f increases) and thus the first interposed part 771 of the first insulating member 770 could not be appropriately compressed in some cases. For instance, when the contact part 783f is to be compressed to bring the second interposed part 783 of the second insulating member 780 in contact (close contact) with the upper surface 713p of the case lid 713 and also the first interposed part 771 of the first insulating member 770 is to be compressed through the second interposed part 783 and the case lid 713, in some cases, the insulating contact part 783ƒ comes to a state subjected to large compression stress (thereby generating large reaction force) before the second interposed part 783 comes to close contact with the upper surface 713p of the case lid 713 and the first interposed part 771 undergoes compression stress, and thus the insulating contact part 783ƒ could not be compressed any more by the compression force (caulking force).

Even when an insulating insertion part is provided in a second insulating member and a distal end of this insertion part is held in contact with a first insulating member to insulate between a hole inner peripheral surface defining a through hole of a case lid and an insert-through part of an electrode connecting member, there is a possibility that appropriate insulation could not be provided between a seat part and the case lid as in the case where the insertion part is provided in the first insulating member as mentioned above. Furthermore, even when it is configured to provide sealing between the outer terminal member and the upper surface of the case lid in addition to or instead of sealing between the seat part and the lower surface of the case lid, this sealing between the outer terminal member and the upper surface of the case lid could not be appropriately achieved for the same reason.

Consequently, in order to appropriately enable at least one of sealing between the seat part of the electrode connecting member and the lower surface of the case lid and sealing between the outer terminal member and the upper surface of the case lid while ensuring insulation between the hole inner peripheral surface defining the through hole of the case lid and the insert-through part of the electrode connecting member, there has been a demand for reduction in compression stress that will act on at least one of the insulating insertion part and the insulating contact part while holding the distal end of the insertion part provided in at least one of the first insulating member and the second insulating member into contact with the other insulating member.

The present invention has been made in view of the circumstances and has a purpose to provide a battery configured with reduced compression stress acting on at least one of an insulating insertion part, provided in at least one of a first insulating member and a second insulating member, and an insulating contact part while bringing a distal end of the insulating insertion part into contact with an insulating contact part of the other insulating member.

Means of Solving the Problems

To achieve the above purpose, one aspect of the invention provides a battery including: a box-shaped case body having an opening; an electrode body enclosed in the case body; a plate-shaped case lid closing the opening of the case body; an electrode connecting member including a seat part located in the case body, an insert-through part having a columnar shape protruding from an upper surface of the seat part and extending through a through hole formed in the case lid to outside, and an electrode body connecting part extending from a lower surface of the seat part toward a bottom of the case body, and configured to electrically connect to the electrode; a first insulating member having an electrically insulating property and including a first interposed part interposed between the upper surface of the seat part and a lower surface of the case lid; an outer terminal member located outside the case body and on an upper surface side of the case lid, and configured to electrically connect to the electrode connecting member; a second insulating member having an electrically insulating property and including a second interposed part interposed between the outer terminal member and the upper surface of the case lid; and a fixing unit to fix the second insulating member, the case lid, and the first insulating member held under compression force between the outer terminal member and the seat part, wherein one of the first insulating member and the second insulating member includes an insulating insertion part having a cylindrical shape and being inserted in the through hole of the case lid to surround the insert-through part of the electrode connecting member, the insulating insertion part having a distal end held in contact with an insulating contact part of the other insulating member, at least one of the insulating insertion part and the insulating contact part is in a compressed state by the compression force in an axial direction of the insulating insertion part, before at least one of the insulating insertion part and the insulating contact part is compressed by the compression force, at least one of the first insulating member, the second insulating member, the case lid, and the insert-through part provides at least either one of a receiving space allowing the insulating insertion part to be deformed into a shape that reduces compression stress acting on the insulating insertion part when the insulating insertion part is compressed and receiving a resultant deformed portion and a receiving space allowing the insulating member including the insulating contact part to be deformed into a shape that reduces compression stress acting on the insulating contact part when the insulating contact part is compressed and receiving a resultant deformed portion, and the deformed portion of at least one of the insulating insertion part and the insulating contact part compressed by the compression force is received in the receiving space.

In the aforementioned battery, one of the first insulating member and the second insulating member includes the insulating insertion part inserted in the through hole of the case lid to surround the insert-through part of the electrode connecting member while the distal end of the insulating insertion part is in contact with the other insulating member. This can ensure insulation between the hole inner peripheral surface defining the through hole of the case lid and the insert-through part of the electrode connecting member.

In the above battery, furthermore, before (just before) at least one of the insulating insertion part and the insulating contact part (corresponding to a portion of the insulating member having no insulating insertion part and contacting with the distal end of the insulating insertion part) is compressed (that is, just before the second insulating member, the case lid, and the first insulating member are subjected to compression force while they are held between the outer terminal member and the seat part during manufacture of the battery), at least one of the first insulating member, the second insulating member, the case lid, and the insert-through part provides at least either one of a "receiving space allowing the insulating insertion part to be deformed into a shape that reduces the compression stress acting on the insulating insertion part (compression force applied to the insulating insertion part) when the insulating insertion part is compressed and receiving a resultant deformed portion" and a "receiving space allowing the insulating member having the insulating contact part (one of the first insulating member and the second insulating member, the one insulating member having the insulating contact part) to be deformed into a shape that reduces the compression stress acting on the insulating contact part when the insulating contact part is compressed and receiving a resultant deformed portion".

Accordingly, the aforementioned battery is obtained as a battery in which at least one of the insulating insertion part and the insulating contact part is in a compressed state by the compression force and the resultant deformed portion is received or housed in the receiving space. To be concrete, when the receiving space is configured to allow the insulating insertion part to be deformed into a shape that reduces the compression stress acting on the insulating insertion part and receive the deformed portion, the battery is arranged so that the deformed portion (part of the insulating insertion part) is received in the receiving space while at least the insulating insertion part is compressed by the compression force. Alternately, when the receiving space is configured to allow the insulating member having the insulating contact part to be deformed into a shape that reduces the compression stress acting on the insulating contact part and receive the deformed portion, the battery is arranged so that the deformed portion (part of the insulating member having the insulating contact part) is received in the receiving space while at least the insulating contact part is compressed by the compression force.

When the deformed portion, i.e., part of the insulating insertion part, is received in the receiving space, the compression stress acting on the insulating insertion part can be reduced accordingly. When the deformed portion, i.e., part of the insulating member having the insulating contact part, is received in the receiving space, the compression stress acting on the insulating contact part can be reduced accordingly.

Consequently, the first interposed part interposed between the seat part and the case lid can be appropriately subjected to compression force. Specifically, the first interposed part can be held and compressed between the seat part and the case lid and thus placed in close contact with the seat part and the case lid. This enables appropriate sealing between the seat part and the case lid. Furthermore, the second interposed part interposed between the outer terminal member and the case lid can also be appropriately subjected to the compression force. Specifically, the second interposed part can be held and compressed between the outer terminal member and the case lid and thus placed in close contact with the outer terminal member and the case lid. This enables appropriate sealing between the outer terminal member and the case lid.

It is to be noted that when both the receiving space that receives part of the insulating insertion part (the deformed portion) and the receiving space that receives part of the insulating member having the insulating contact part (the deformed portion) are provided, they may be formed separately (at different places) or integrally (as a single receiving space). In a case of providing the receiving space that receives part of the insulating insertion part (the deformed portion), this receiving space may be formed as a single receiving space or a plurality of receiving spaces. In a case of providing the receiving space that receives part of the insulating member having the insulating contact part (the deformed portion), this receiving space also may be formed as a single receiving space or a plurality of receiving spaces.

As the fixing unit, for example, there is a deformed part continuous with the distal end (the upper end) of the insert-through part of the electrode connecting member. In this case, the fixing unit is included in the electrode connecting member. This deformed part has for example a columnar shape before being deformed or caulked. When it is to be deformed, the deformed part is inserted, from its distal end, into the through hole of the first insulating member, the through hole of the case lid, the through hole of the second insulating member, and the through hole of the outer terminal member in this order, and crushed downward (toward the seat part) and deformed into a circular disk shape, thereby pressing the outer terminal member downward (toward the seat part). This makes it possible to fix the second insulating member, the case lid, and the first insulating member held under the compression force between the outer terminal member and the seat part.

As another fixing unit, for example, there is a fastening bolt including a head portion and a shaft portion formed with external screw threads. In this case, the insert-through part of the electrode connecting member includes a cylindrical distal end portion formed with internal screw threads engageable with the external screw threads of the bolt. To be concrete, for example, the insert-through part is inserted, from its distal end, into the through hole of the first insulating member, the through hole of the case lid, the through hole of the second insulating member, and the through hole of the outer terminal member in this order, and the external screw threads of the fixing bolt are threadedly engaged with the internal screw threads of the insert-through part and thereby the head portion of the fixing bolt presses the outer terminal member downwards (toward the seat part). Accordingly, the second insulating member, the case lid, and the first insulating member can be fixed while they are held under the compression force between the outer terminal member and the seat part.

Still another fixing unit may be for example a welded part formed by welding the insert-through part of the electrode connecting member and the outer terminal member. To be concrete, for example, the insert-through part is inserted, from its distal end, into the through hole of the first insulating member, the through hole of the case lid, the through hole of the second insulating member, and the through hole of the outer terminal member in this order, and the insert-through part of the electrode connecting member and the outer terminal member are welded, so that the second insulating member, the case lid, and the first insulating member are fixed while they are held under compression force between the outer terminal member and the seat part.

In the aforementioned battery, preferably, the insulating insertion part before compressed by the compression force has an outer peripheral surface including an outer tapered surface having a diameter decreasing toward the distal end of the insulating insertion part, before the insulating insertion part is compressed, the receiving space is formed between the outer tapered surface and a hole inner peripheral surface defining the through hole of the case lid, to allow the insulating insertion part to be deformed into a shape that reduces the compression stress acting on the insulating insertion part when the insulating insertion part is compressed and receive a resultant deformed portion, and a portion including the outer tapered surface, of the insulating insertion part compressed by the compression force, is deformed toward and received in the receiving space.

Before compression, the insulating insertion part constituting the aforementioned battery has the outer peripheral surface including the outer tapered surface that decreases in diameter toward the distal end of the insulating insertion part, so that the receiving space is formed between the outer tapered surface and the hole inner peripheral surface defining the through hole of the case lid. Accordingly, when the insulating insertion part is compressed by the compression force, a portion including the outer tapered surface (part of the portion), of the insulating insertion part, is deformed toward the receiving space (that is, in a direction to escape from the compression force, i.e., in a direction to reduce the compression stress acting on the portion) and received in the receiving space.

Consequently, the aforementioned battery is configured such that the portion having the outer tapered surface (part of the portion), of the insulating insertion part, is deformed toward the receiving space (that is, in a direction to escape from the compression force, i.e., in a direction to reduce the compression stress acting thereon) and received in the receiving space. The aforementioned battery is thus obtained as a battery with reduced compression stress acting on the insulating insertion part.

The outer tapered surface has only to be configured such that the outer peripheral surface of the insulating insertion part has a diameter decreasing toward the distal end of the insulating insertion part. This is not limited to the shape with a straight generating line (a profile line appearing along the outer tapered surface in a cross section taken along an axis of the insulating insertion part) but may be the shape with a curved generating line.

In one of the aforementioned batteries, further preferably, the insulating insertion part before compressed by the compression force has an inner peripheral surface including an inner tapered surface having a diameter increasing toward the distal end of the insulating insertion part, before the insulating insertion part is compressed, the receiving space is formed between the inner tapered surface and the insert-through part of the electrode connecting member to allow the insulating insertion part to be deformed into a shape that reduces the compression stress acting on the insulating insertion part when the insulating insertion part is compressed and receive a resultant deformed portion, and a portion including the inner tapered surface, of the insulating insertion part compressed by the compression force, is deformed toward and received in the receiving space.

Before compression, the insulating insertion part constituting the aforementioned battery has the inner peripheral surface including the inner tapered surface that increases in diameter toward the distal end of the insulating insertion part, so that the receiving space is formed between the inner tapered surface and the insert-through part of the electrode connecting member. Accordingly, when the insulating insertion part is compressed by the compression force, a portion including the inner tapered surface (part of the portion), of the insulating insertion part, is deformed toward the receiving space (that is, in a direction to escape from the compression force, i.e., in a direction to reduce the compression stress acting thereon) and received in the receiving space.

Consequently, the aforementioned battery is configured such that the portion including the inner tapered surface (part of the portion), of the insulating insertion part, is deformed toward the receiving space (that is, in a direction to escape from the compression force, i.e., in a direction to reduce the compression stress acting thereon) and received in the receiving space. The aforementioned battery is thus obtained as a battery with reduced compression stress acting on the insulating insertion part.

The inner tapered surface has only to be configured such that the inner peripheral surface of the insulating insertion part has a diameter increasing toward the distal end of the insulating insertion part. This is not limited to the shape with a straight generating line (a profile line appearing along the inner tapered surface in a cross section taken along an axis of the insulating insertion part) but may be the shape with a curved generating line.

In one of the aforementioned batteries, preferably, a hole inner peripheral surface defining the through hole of the case lid includes a hole tapered surface having a diameter increasing toward the upper surface of the case lid, before the insulating insertion part is compressed, the receiving space is formed between the hole tapered surface and the outer peripheral surface of the insulating insertion part to allow the insulating insertion part to be deformed into a shape that reduces the compression stress acting on the insulating insertion part when the insulating insertion part is compressed and receive a resultant deformed portions, and a portion of the insulating insertion part compressed by the compression force is deformed toward and received in the receiving space.

Before the insulating insertion part is compressed, the case lid and the insulating insertion part of the aforementioned battery create the receiving space between the hole tapered surface of the case lid and the outer peripheral surface of the insulating insertion part. When the insulating insertion part is compressed by the compression force, accordingly, part of the insulating insertion part (a portion adjacent to the receiving space) is deformed toward the receiving space (that is, in a direction to escape from the compression force, i.e., in a direction to reduce the compression stress acting thereon) and received in the receiving space.

Consequently, the aforementioned battery is configured such that the portion of the insulating insertion part (the portion adjacent to the receiving space) is deformed toward the receiving space (that is, in a direction to escape from the compression force, i.e., in a direction to reduce the compression stress acting thereon) and received in the receiving space. The aforementioned battery is thus obtained as a battery with reduced compression stress acting on the insulating insertion part.

The hole tapered surface has only to be configured to have a diameter increasing toward the upper surface of the case lid and is not limited to the shape with a straight generating line (a profile line appearing along the hole tapered surface in a cross section of the case lid taken along an axis of the through hole) but may be the shape with a curved generating line.

In one of the aforementioned batteries, further preferably, an outer peripheral surface of the insert-through part of the connecting member includes an insert-through recess recessed radially inward, the insert-through recess forms the receiving space allowing the insulating insertion part to be deformed into a shape that reduces the compression stress acting on the insulating insertion part when the insulating insertion part is compressed and receiving a resultant deformed portion, and a portion of the insulating insertion part compressed by the compression force is deformed toward and received in the insert-through recess.

The electrode connecting member of the aforementioned battery includes the insert-through recess radially inward recessed in the outer peripheral surface of the insert-through part. This recess defines the receiving space. Accordingly, when the insulating insertion part is compressed by the compression force, part of the insulating insertion part (a portion adjacent to the recess) is deformed toward the recess (that is, in a direction to escapes from the compression force, i.e., in a direction to reduce the compression stress acting thereon) and received in the recess.

Consequently, the aforementioned battery is configured such that part of the insulating insertion part (a portion adjacent to the recess) is deformed toward the recess (that is, in a direction to escapes from the compression force, i.e., in a direction to reduce the compression stress acting thereon) and received in the recess. The aforementioned battery is thus obtained as a battery with reduced compression stress acting on the insulating insertion part.

The insert-through recess has only to be configured to be radially inward recessed in the outer peripheral surface of the insert-through part. The recessed shape (a profile line appearing along the insert-recess in a cross section taken along an axis of the insert-through part) may be any shape. For example, the recessed shape may be rectangular, circular-arc, and others.

In one of the aforementioned batteries, further preferably, one of the first insulating member and the second insulating member, which does not include the insulating insertion part, has a facing surface that faces the distal end of the insulating insertion part in the axial direction, the facing surface including an insulating recess recessed in the axial direction before the insulating insertion part is compressed, before the insulating insertion part is compressed, the insulating recess forms the receiving space allowing the insulating insertion part to be deformed into a shape that reduces the compression stress acting on the insulating insertion part when the insulating insertion part is compressed and receiving a resultant deformed portion, and the distal end of the insulating insertion part compressed by the compression force is deformed toward and received in the insulating recess.

Before the insulating insertion part is compressed, in one of the first insulating member and the second insulating member of the aforementioned battery, the one having no insulating insertion part, the facing surface that faces the distal end of the insulating insertion part in the axial direction includes the insulating recess recessed in the axial direction (in part of the facing surface). This insulating recess defines the receiving space. Accordingly, when the insulating insertion part is compressed by the compression force, the distal end of the insulating insertion part is deformed toward the insulating recess (that is, in a direction to escape from the compression force, i.e., in a direction to reduce the compression stress acting thereon) and received in the recess.

Consequently, the aforementioned battery is configured such that the distal end of the insulating insertion part when compressed by the compression force is deformed toward the insulating recess (that is, in a direction to escape from the compression force, i.e., in a direction to reduce the compression stress acting thereon) and received in the insulating recess. The aforementioned battery is thus obtained as a battery with reduced compression stress acting on the insulating insertion part.

The insulating recess has only to be configured to be recessed in the facing surface in the axial direction of the insulating insertion part. The recessed shape (a profile line appearing along the insulating recess in a cross section taken along an axis of the insulating insertion part) may be any shape. For example, the recessed shape may be rectangular, circular-arc, and others.

MODE FOR CARRYING OUT THE INVENTION

Example 1

Figure 1:
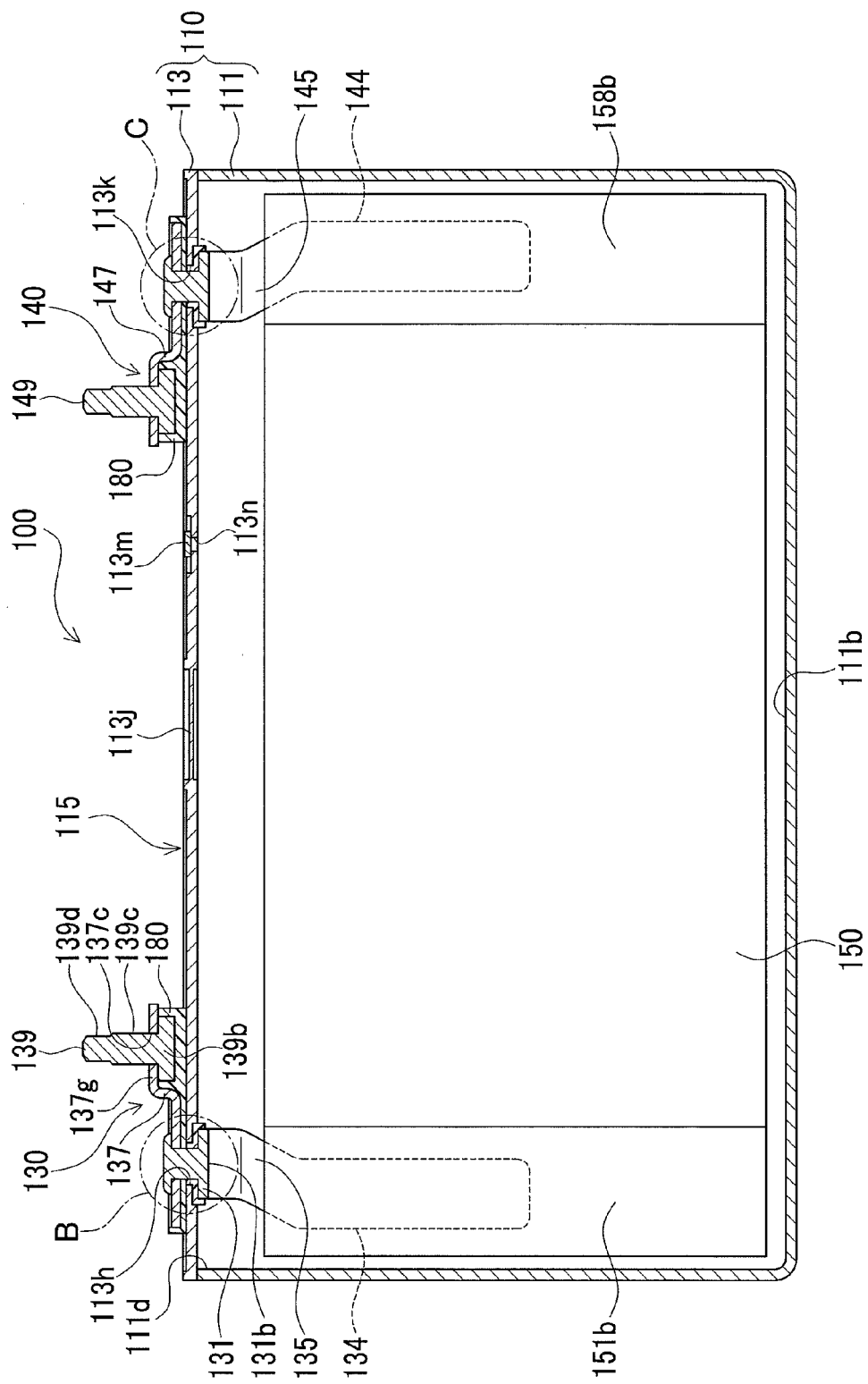
FIG. 1 is a vertical cross sectional view of a battery in Example 1.
Figure 2:
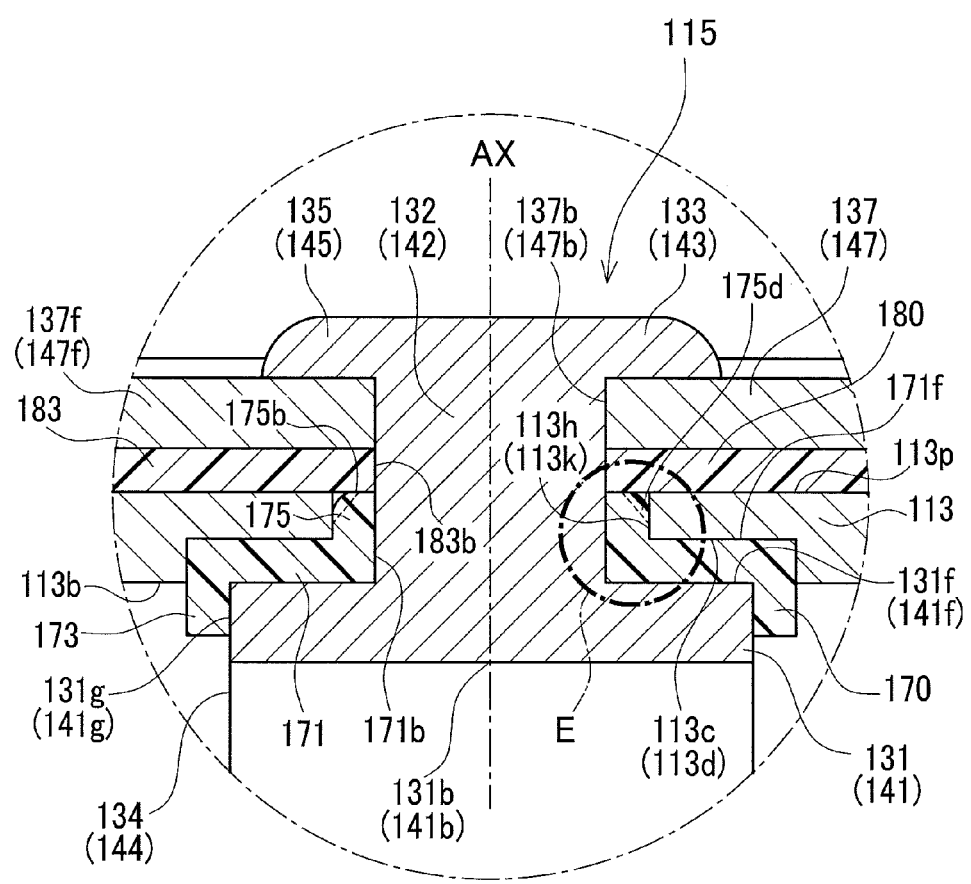
FIG. 2 is an enlarged view of a section B and a section C in FIG. 1.
Figure 3:
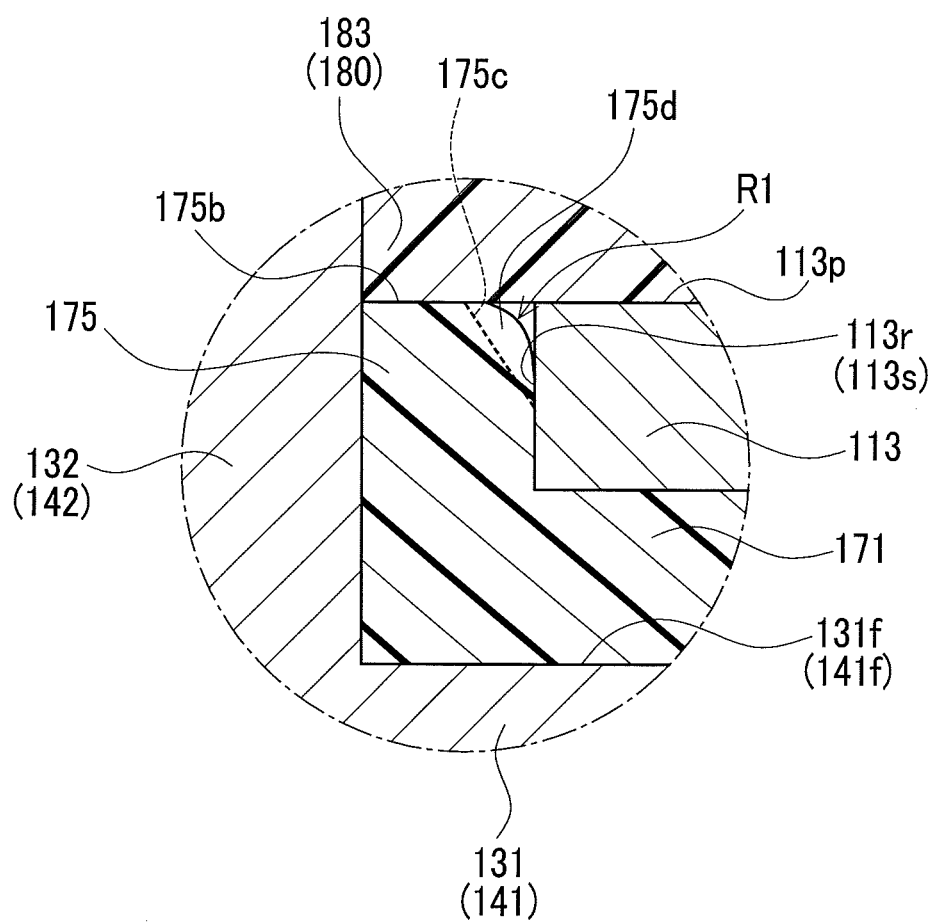
FIG. 3 is an enlarged view of a section E in FIG. 2.
Figure 4:
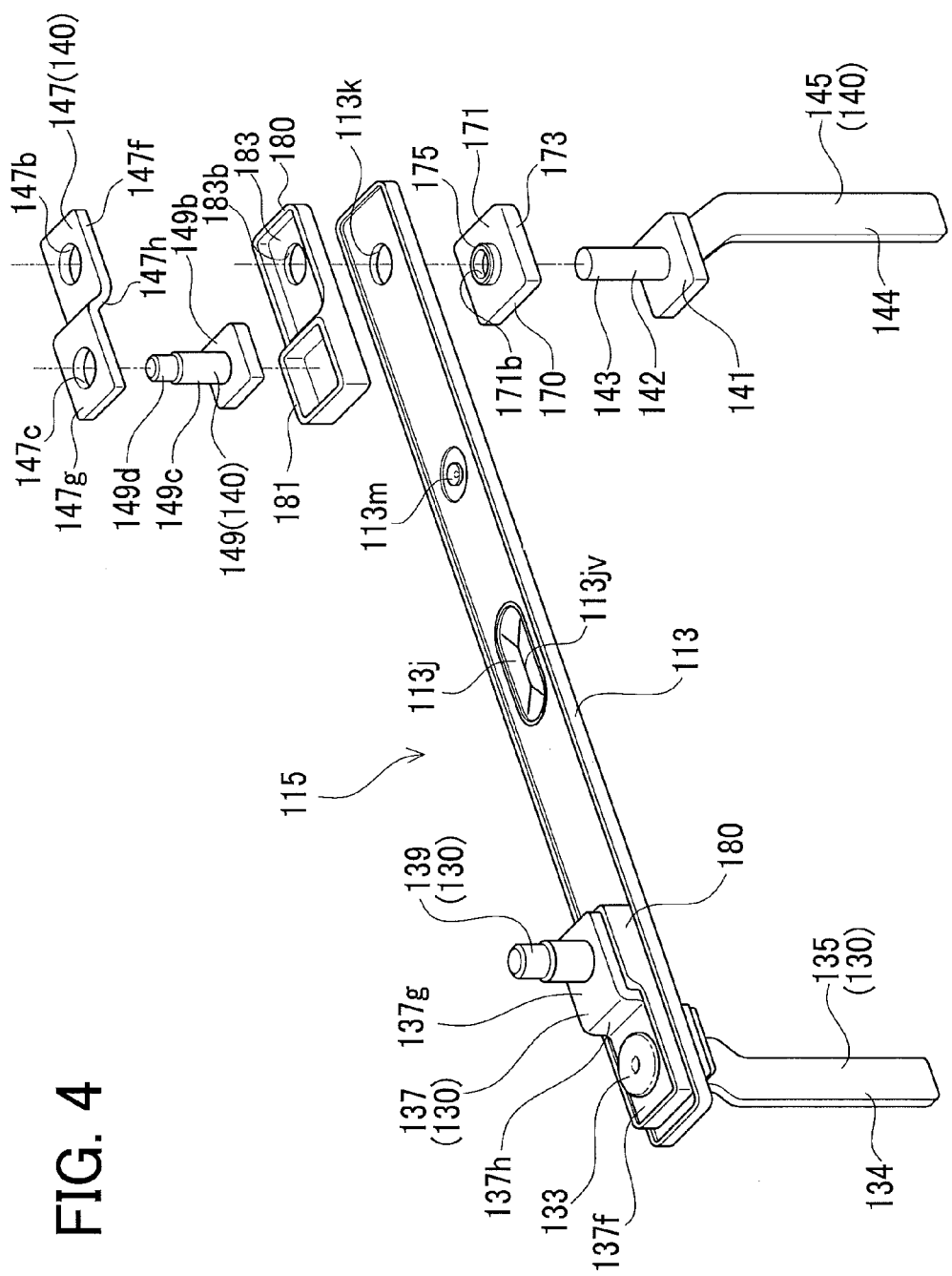
FIG. 4 is an exploded perspective view of a terminal-attached lid member in Example 1.

A detailed description of Example 1 of the present invention will now be given referring to the accompanying drawings. FIG. 1 is a cross sectional view of a battery 100 in Example 1. FIG. 2 is an enlarged view of a section B and a section C in FIG. 1. Different parts or components in the section C from those in the section B are assigned with parenthesized reference signs in FIG. 2. FIG. 3 is an enlarged view of a section E in FIG. 2. FIG. 4 is an exploded perspective view of part of a lid member 115 attached with terminals (terminal-attached lid member) in Example 1.

The battery 100 in Example 1 is, as shown in FIG. 1, a lithium ion secondary battery that includes a case body 111 of a rectangular box shape having an opening 111d, and an electrode body 150 enclosed in the case body 111. The battery 100 further includes a plate-shaped case lid 113 that closes the opening 111d of the case body 111. The case body 111 and the case lid 113 are integrally welded to each other, forming a battery case 110.

The case lid 113 has a rectangular plate-like shape and is formed with circular through holes 113h, 113k each penetrating through the case lid 113 in positions near both ends in a long-side direction (a lateral direction in FIG. 1). The case lid 113 is further provided, at its center in the long-side direction, with a safety valve 113j. This safety valve 113j is formed integral with the case lid 113 to constitute a part of the case lid 113.

The safety valve 113j is formed to be thinner than other portions of the case lid 113 and is formed, on its upper surface, with a groove 113jv (see FIG. 4). Accordingly, the safety valve 113j operates when the internal pressure of the battery case 110 reaches a predetermined pressure. Specifically, the groove 113jv ruptures when the internal pressure reaches the predetermined pressure, thereby allowing gas in the battery case 110 to release out.

The case lid 113 is formed, between the safety valve 113j and the through hole 113k, with a liquid inlet 113n (see FIG. 1) through which electrolyte (not shown) is injected into the battery case 110. This liquid inlet 113n is sealed with a plug 113m.

The battery 100 further includes electrode terminal members (a positive terminal member 130 and a negative terminal member 140) each of which is connected to the electrode body 150 inside the case body 111 and extends out through respective through holes 113h and 113k of the case lid 113.

The positive terminal member 130 consists of a positive connecting member 135, a positive outer terminal member 137, and a positive fastening member (bolt) 139 (see FIGS. 1 and 4). The connecting member 135 is made of metal and connected to the electrode body 150 and extends out through the through hole 113h of the case lid 113. The outer terminal member 137 is made of metal and located on the case lid 113, that is, outside the battery case 110, and is electrically connected to the connecting member 135 outside the battery case 110. The fastening member 139 is made of metal and located on the case lid 113, that is, outside the battery case 110, and is electrically connected or connectable to the outer terminal member 137.

In details, the positive connecting member 135 includes a seat part 131, an insert-through part 132, an electrode body connecting part 134, and a deformed part 133 (see FIGS. 1 to 4). The seat part 131 has a rectangular plate-like shape and is located in the case body 111. The insert-through part 132 has a columnar shape protruding from an upper surface 131f of the seat part 131 and is inserted through the through hole 113h of the case lid 113 to the outside of the battery case 110 (case body 111). The deformed part 133 is a portion continuous with an upper end of the insert-through part 132 and is deformed by caulking (riveting) (deformed to extend in diameter) into a circular disk shape, and thus electrically connected to the positive outer terminal member 137. The connecting part 134 is shaped to extend from a lower surface 131b of the seat part 131 toward a bottom 111b of the case body 111 and is bonded to a positive mixture layer uncoated portion 151b of the electrode body 150. Thus, the positive connecting member 135 and the electrode body 150 are electrically and mechanically connected to each other.

The positive outer terminal member 137 is made of a metal plate and has a nearly Z shape in side view. This outer terminal member 137 includes a fixed part 137f fixed by the deformed part 133, a connection part 137g connected to the fastening member 139, and a joint part 137h joining the fixed part 137f and the connection part 137g. The fixed part 137f is formed with a through hole 137b penetrating therethrough. In this through hole 137b, the insert-through part 132 of the positive connecting member 135 is inserted. The connection part 137g is also formed with a through hole 137c penetrating therethrough.

The positive fastening member 139 is a metal bolt including a rectangular plate-shaped head portion 139b and a columnar shaft portion 139c. The shaft portion 139c includes a distal end portion formed with screw threads 139d. The shaft portion 139c of the fastening member 139 is inserted in the through hole 137c of the positive outer terminal member 137.

The negative terminal member 140 consists of a negative connecting member 145, a negative outer terminal member 147, and a negative fastening member 149 (bolt) (see FIGS. 1 and 4). The connecting member 145 is made of metal and connected to the electrode body 150 and also extends out through the through hole 113k of the case lid 113. The outer terminal member 147 is made of metal and located on the case lid 113, that is, outside the battery case 110, and is electrically connected to the connecting member 145 outside the battery case 110. The fastening member 149 is made of metal and located on the case lid 113, that is, outside the battery case 110, and is electrically connected or connectable to the outer terminal member 147.

In details, the negative connecting member 145 includes a seat part 141, an insert-through part 142, an electrode body connecting part 144, and a deformed part 143 (see FIGS. 1 to 4). The seat part 141 has a rectangular plate-like shape and is located in the case body 111. The insert-through part 142 has a columnar shape protruding from an upper surface 141f of the seat part 141 and is inserted through the through hole 113k of the case lid 113. The deformed part 143 is a portion continuous with an upper end of the insert-through part 142 and is riveted (deformed to extend in diameter) into a circular disk shape, and thus electrically connected to the negative outer terminal member 147. The connecting part 144 is shaped to extend from a lower surface 141b of the seat part 141 toward the bottom 111b of the case body 111 and is bonded to a negative mixture layer uncoated portion 158b of the electrode body 150. Thus, the negative connecting member 145 and the electrode body 150 are electrically and mechanically connected to each other. The positive connecting member 135 and the negative connecting member 145 correspond to an electrode connecting member recited in claims.

The negative outer terminal member 147 is made of a metal plate and has a nearly Z shape in side view. This outer terminal member 147 includes a fixed part 147f fixed by the deformed part 143, a connection part 147g connected to the fastening member 149, and a joint part 147h joining the fixed part 147f and the connection part 147g. The fixed part 147f is formed with a through hole 147b penetrating therethrough. In this through hole 147b, the insert-through part 142 of the negative connecting member 145 is inserted. The connection part 147g is also formed with a through hole 147c penetrating therethrough. The positive outer terminal member 137 and the negative outer terminal member 147 correspond to an outer terminal member recited in claims.

The negative fastening member 149 is a metal bolt including a rectangular plate-shaped head portion 149b and a columnar shaft portion 149c. The shaft portion 149c includes a distal end portion formed with screw threads 149d. The shaft portion 149c of the fastening member 149 is inserted in the through hole 147c of the negative outer terminal member 147.

The battery 100 further includes a first insulating member 170 interposed between the positive terminal member 130 (i.e., the positive connecting member 135) and the case lid 113 to electrically insulate them from each other. Another first insulating member 170 is also interposed between the negative terminal member 140 (i.e., the negative connecting member 145) and the case lid 113.

To be concrete, each first insulating member 170 is made of electrically insulating and elastically deformable resin and includes a first interposed part 171, an insulating side wall 173, and an insulating insertion part 175 (see FIGS. 2 and 4). The first interposed part 171 has a flat plate-like shape formed, at its center, with a circular through hole 171b in which the insert-through part 132 (insert-through part 142) of the positive terminal member 130 (negative terminal member 140) is inserted. This first interposed part 171 is interposed between the upper surface 131f (upper surface 141f) of the seat part 131 (seat part 141) of the positive terminal member 130 (negative terminal member 140) and the lower surface 113b of the case lid 113 (in details, the lower surface 113b within a recess 113c, 113d mentioned later) of the case lid 113.

The insulating side wall 173 is a rectangular annular side wall located on a peripheral edge of the first interposed part 171. This side wall 173 surrounds an outer peripheral surface 131g (outer peripheral surface 141g) of the seat part 131 (seat part 141).

Figure 5:
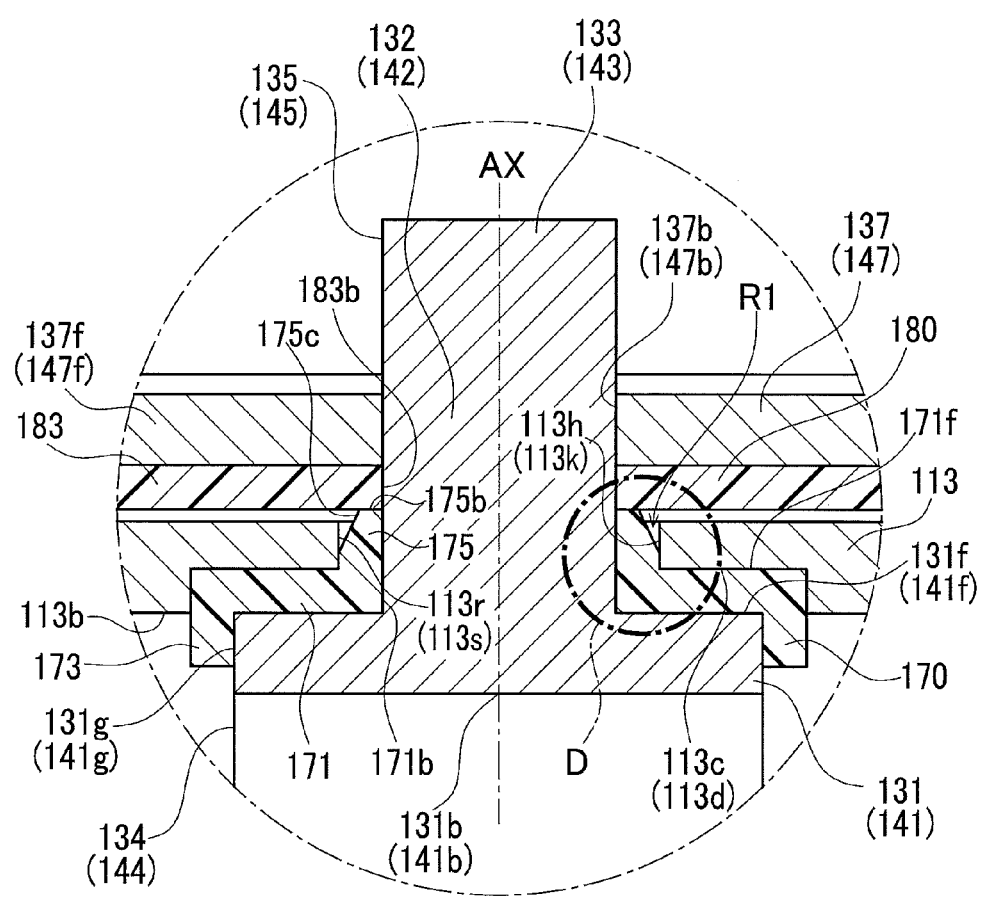
FIG. 5 is a view of the same section as in FIG. 2, showing a state just before a deformed part is deformed by caulking (riveting)

The insulating insertion part 175 has a cylindrical shape protruding from an upper surface 171f of the first interposed part 171. This insertion part 175 is inserted through the through hole 113h (through hole 113k) of the case lid 113 so as to surround the insert-through part 132 (insert-through part 142) of the positive connecting member 135 (negative connecting member 145), and is compressed in an axial direction (in a direction along the axis AX). The axial length of the insertion part 175 before compressed is longer than the length (depth) of the through hole 113h (through hole 113k) as shown in FIG. 5.

The battery 100 further includes a second insulating member 180 made of electrically insulating resin and placed on the case lid 113. This second insulating member 180 is interposed between the positive terminal member 130 (concretely, the positive outer terminal member 137 and the positive fastening member 139) and upper surface 113p of the case lid 113 to electrically insulate them from each other. Another second insulating member 180 is also interposed between the negative terminal member 140 (concretely, the negative outer terminal member 147 and the negative fastening member 149) and the case lid 113.

Specifically, each second insulating member 180 includes a head portion placing part 181 in which the head portion 139b of the positive fastening member 139 (head portion 149b of the negative fastening member 149) is placed, and a second interposed part 183 interposed between the positive outer terminal member 137 and the upper surface 113p of the case lid 113. On this second interposed part 183, the fixed part 137f of the positive outer terminal member 137 (fixed part 147f of the negative outer terminal member 147) is placed. The second interposed part 183 is formed with a through hole 183b penetrating therethrough. In this through hole 183b, the insert-through part 132 of the positive terminal member 130 (insert-through part 142 of the negative terminal member 140) is inserted.

In Example 1, the deformed part 133 of the positive terminal member 130 fixes the second insulating member 180, the case lid 113, and the first insulating member 170 held under compression force between the positive outer terminal member 137 and the seat part 131 (see FIG. 2). In Example 1, the first insulating member 170 (insulating insertion part 175) is made of resin that is more deformable by compression (softer) in an axial direction than the second insulating member 180.

This deformed part 133 has a columnar shape before being deformed by caulking (riveting) (see FIG. 5). When it is to be deformed by caulking, firstly, the deformed part 133 and the insert-through part 132 are inserted, from their distal ends, into the through hole 171b of the first insulating member 170, the through hole 113h of the case lid 113, the through hole 183b of the second insulating member 180, and the through hole 137b of the positive outer terminal member 137 in this order. In this state, successively, the deformed part 133 is deformed by caulking or riveting, thereby pressing the positive outer terminal member 137 downward (toward the seat part 131). To be concretely, the deformed part 133 is crushed downward (toward the seat part 131) and deformed into a circular disk shape, thereby pressing the positive outer terminal member 137 downward (toward the seat part 131).

Accordingly, the second insulating member 180, the case lid 113, and the first insulating member 170 can be fixed while they are held or clamped under compression force between the positive outer terminal member 137 and the seat part 131. At that time, the insulating insertion part 175 of the first insulating member 170 is elastically compressed in its own axial direction (a vertical direction in FIG. 2) by the compression force while a distal end 175b of the insertion part 175 is in contact (close contact) with the second insulating member 180 (second interposed part 183).

The deformed part 143 of the negative terminal member 140 fixes the second insulating member 180, the case lid 113, and the first insulating member 170 held under compression force between the negative outer terminal member 147 and the seat part 141 (see FIG. 2). The deformed parts 133, 143 correspond to a fixing unit recited in claims.

This deformed part 143 also has a columnar shape before being deformed by caulking (riveting) (see FIG. 5). When it is to be deformed by caulking, firstly, the deformed part 143 and the insert-through part 142 are inserted, from their distal ends, into the through hole 171b of the first insulating member 170, the through hole 113k of the case lid 113, the through hole 183b of the second insulating member 180, and the through hole 147b of the negative outer terminal member 147 in this order. In this state, successively, the deformed part 143 is deformed by caulking or riveting, thereby pressing the negative outer terminal member 147 downward (toward the seat part 141). To be concretely, the deformed part 143 is crushed downward (toward the seat part 141) and deformed into a circular disk shape, thereby pressing the negative outer terminal member 147 downward (toward the seat part 141).

Accordingly, the second insulating member 180, the case lid 113, and the first insulating member 170 can be fixed while they are held or clamped under compression force between the negative outer terminal member 147 and the seat part 141. At that time, the insulating insertion part 175 of the first insulating member 170 is elastically compressed in its own axial direction (vertical direction in FIG. 2) by the compression force while a distal end 175b of the insulating insertion part 175 is in contact (close contact) with the second insulating member 180 (second interposed part 183).

In Example 1, since the deformed parts 133, 143 are deformed by caulking (riveting) as described above, the case lid 113, the positive terminal member 130, the negative terminal member 140, the first insulating members 170, 170, and the second insulating members 180, 180 are made integral, constituting the terminal-attached lid member 115.

Figure 8:
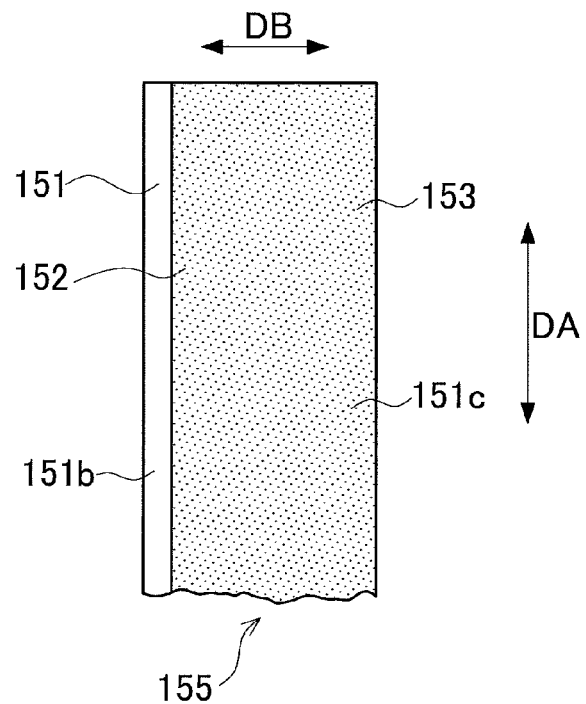
FIG. 8 is a view of a positive electrode sheet constituting the electrode body.

The electrode body 150 is a wound electrode body of a flattened shape, in which a strip-shaped positive electrode sheet 155, a strip-shaped negative electrode sheet 156, and separators 157 are wound together into a flattened shape (see FIGS. 7 to 10). The positive electrode sheet 155 includes a strip-shaped positive substrate 151 being made of an aluminum foil and extending in a longitudinal direction DA, and positive electrode mixture layers 152 each placed on part of each surface of the substrate 151 as shown in FIG. 8. The positive electrode mixture layer 152 contains positive active material 153, electrically conductive material made of acetylene black, and PVDF (binder).

Of the positive substrate 151, a portion coated with the positive electrode mixture layers 152 is referred to as a positive mixture layer coated portion 151*c*, while a portion not coated with the positive electrode mixture layer 152 is referred to as a positive mixture layer uncoated portion 151*b*. This uncoated portion 151*b* is located at one end (a left end in FIG. 8) of the substrate 151 (positive electrode sheet 155) in a width direction DB (a lateral direction in FIG. 8) and extends along one long side of the substrate 151 (positive electrode sheet 155) in a strip shape extending in the longitudinal direction DA of the substrate 151 (positive electrode sheet 155).

Figure 9:
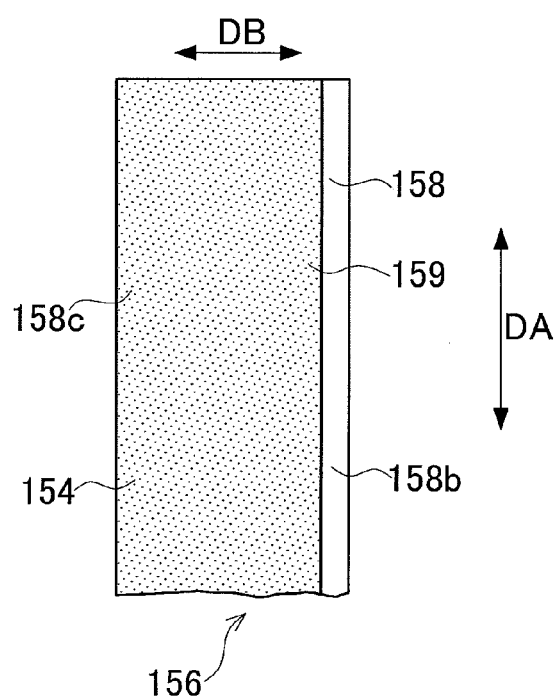
FIG. 9 is a view of a negative electrode sheet constituting the electrode body.

The negative electrode sheet 156 includes a strip-shaped negative substrate 158 being formed of a copper foil and extending in the longitudinal direction DA, and negative electrode mixture layers 159 each placed on part of each surface of the substrate 158 as shown in FIG. 9. The negative electrode mixture layer 159 contains negative active material 154, SBR (binder), and CMC (thickener).

Of the negative substrate 158, a portion coated with the negative electrode mixture layers 159 is referred to as a negative mixture layer coated portion 158*c*, while a portion uncoated with the negative electrode mixture layer 159 is referred to as a negative mixture layer uncoated portion 158*b*. This uncoated portion 158*b* extends along one long side of the substrate 158 (negative electrode sheet 156) in a strip shape extending in the longitudinal direction DA of the substrate 158 (negative electrode sheet 156), that is, in the vertical direction in FIG. 9.

Meanwhile, in the battery 100 in Example 1, each first insulating member 170 includes the insulating insertion part 175 inserted in the through hole 113*h* (through hole 113*k*) of the case lid 113 to surround the insert-through part 132 (insert-through part 142) of the positive connecting member 135 (negative connecting member 145). In addition, this insertion part 175 is in an elastically compressed state in its axial direction (the vertical direction in FIG. 2) while the distal end 175*b* is held in contact (close contact) with the second insulating member 180 (second interposed part 183). The insertion part 175 can ensure insulation between a hole inner peripheral surface 113*r* (113*s*) defining the through hole 113*h* (through hole 113*k*) of the case lid 113 and the insert-through part 132 (insert-through part 142) of the positive connecting member 135 (negative connecting member 145).

In the battery 100 in Example 1, furthermore, as shown in FIGS. 2 and 3, while the insulating insertion part 175 is in a compressed state by the compression force, part of the insulating insertion part 175 deformed by the compression force (a deformed portion 175*d*, see FIG. 3) is received in a receiving space R1. Since part of the insertion part 175 (deformed portion 175*d*) enters in the receiving space R1, the compression stress acting on the insertion part 175 is reduced.

Figure 6:
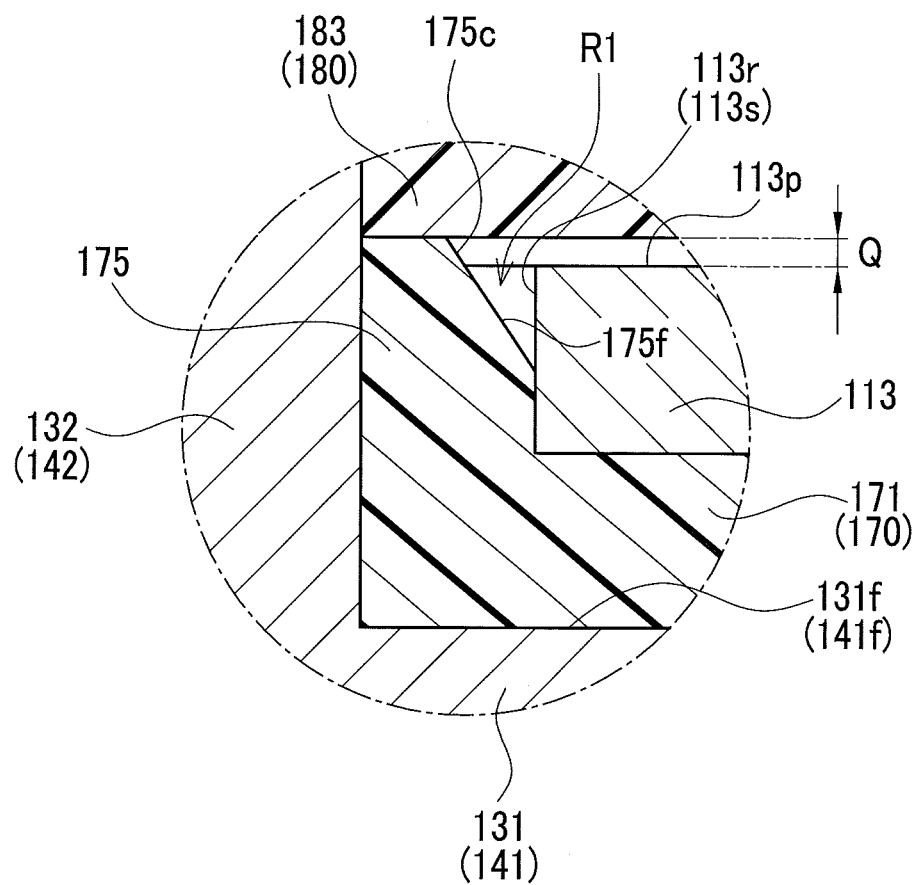
FIG. 6 is an enlarged view of a section D in FIG. 5.
Figure 7:
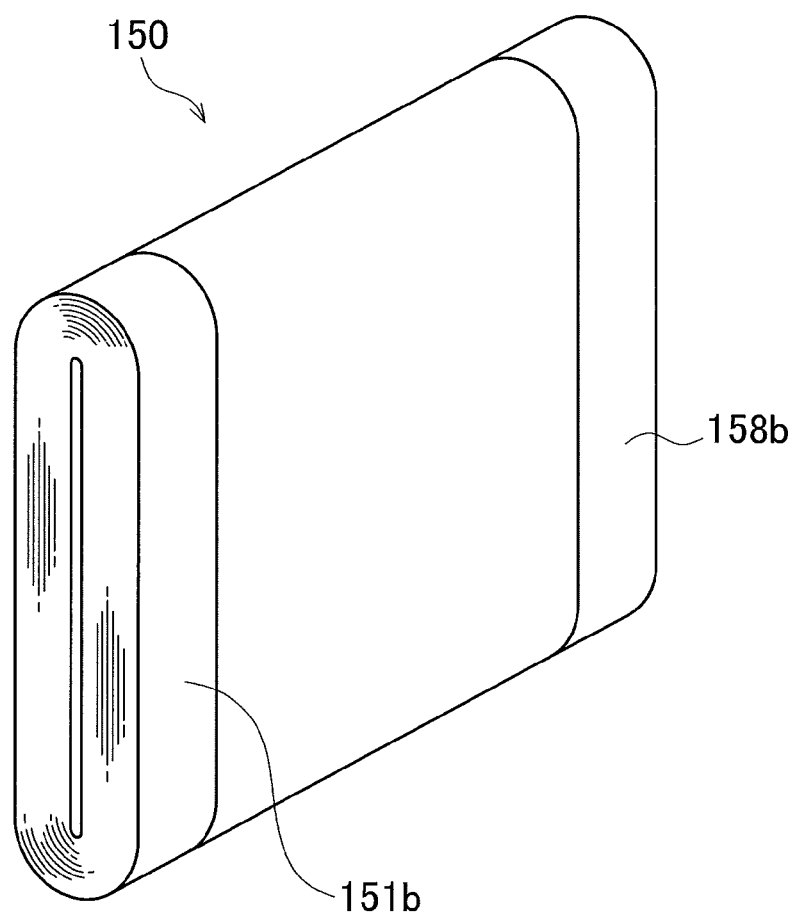
FIG. 7 is a perspective view of an electrode body in Example 1.

To be concrete, as shown in FIGS. 5 and 6, before the deformed part 133, 143 is deformed by caulking or riveting (before the insertion part 175 is compressed by the compression force) the insulating insertion part 175 has an outer peripheral surface 175*f* including an outer tapered surface 175*c* having a diameter decreasing toward the distal end 175*b*. Furthermore, before the insertion part 175 is compressed, the receiving space R1 is formed annularly between the outer tapered surface 175*c* and the hole inner peripheral surface 113*r* (113*s*) defining the through hole 113*h* (through hole 113*k*) of the case lid 113. This receiving space R1 allows the insertion part 175 to be deformed into a shape that reduces the compression stress (the compression force applied to the insertion part 175 in the direction of the axis AX) acting on the insulating insertion part 175 when compressed, and receives a resultant extruded, or deformed, portion (a deformed portion 175*d*, see FIG. 3).

Accordingly, when the insulating insertion part 175 is compressed by the compression force, the portion including the outer tapered surface 175*c*, of the insertion part 175, is deformed toward the receiving space R1 (radially outward of the insulating insertion part 175) and received in the receiving space R1. Specifically, the portion including the outer tapered surface 175*c*, of the insulating insertion part 175, is deformed in a direction to escape from the compression force (in a direction to reduce the compression stress acting on the insulating insertion part 175) and received in the receiving space R1. This can reduce the compression stress acting on the insulating insertion part 175.

Consequently, when the deformed part 133, 143 is deformed by caulking or riveting, the compression force can be appropriately applied to the first interposed part 171 interposed between the seat part 131, 141 and the case lid 113. In other word, the first interposed part 171 of the first insulating member 170 can be held and compressed between the seat part 131, 141 and the case lid 113 and thus placed in close contact with the seat part 131, 141 and the case lid 113. This can achieve appropriate sealing between the seat part 131, 141 and the case lid 113.

Furthermore, the compression force can also be appropriately applied to the second interposed part 183 interposed between the positive outer terminal member 137 (negative outer terminal member 147) and the case lid 113. In other words, the second interposed part 183 of the second insulating member 180 can be held and compressed between the positive outer terminal member 137 (negative outer terminal member 147) and the case lid 113 and thus placed in close contact with the positive outer terminal member 137 (negative outer terminal member 147) and the case lid 113. This can achieve appropriate sealing between the positive outer terminal member 137 (negative outer terminal member 147) and the case lid 113.

Figure 11:
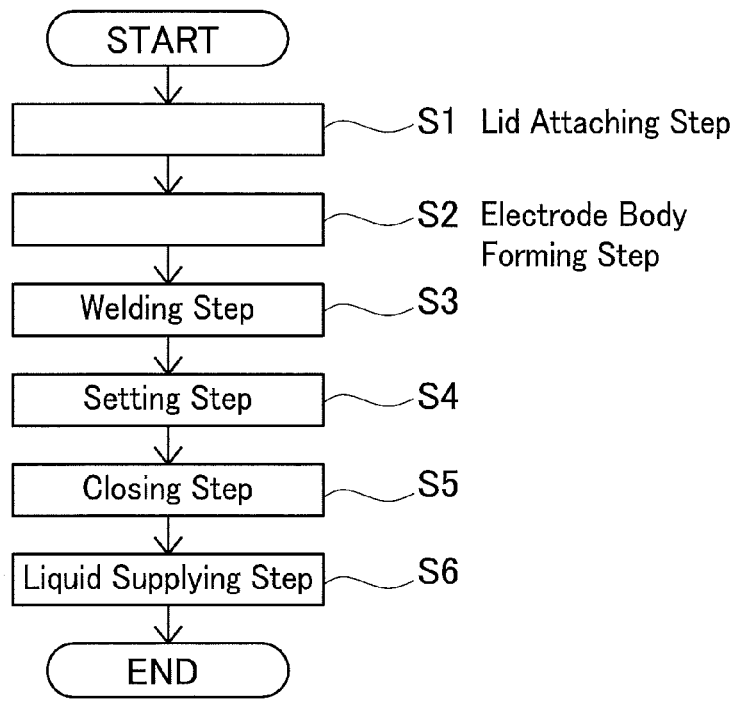
FIG. 11 is a flowchart showing a flow of a method for manufacturing the battery in example 1.

Next, a method for manufacturing the battery in Example 1 will be explained. As shown in FIG. 11, in step S1 (a lid assembling step), the terminal-attached lid member 115 is assembled. To be concrete, the rectangular plate-shaped case lid 113 is first prepared. At this time, the liquid inlet 113*n* of the case lid 113 is not sealed with the plug 113*m* (the plug 113*m* is not attached).

Furthermore, the positive connecting member 135, the positive outer terminal member 137, and the positive fastening member 139 are prepared. Also, the negative connecting member 145, the negative outer terminal member 147, and the negative fastening member 149 are prepared.

Two first insulating members 170 and two second insulating members 180 are further prepared. At that time, the deformed part 133 of the positive connecting member 135 and the deformed part 143 of the negative connecting member 145 are not deformed yet and hence have a columnar shape (seed FIGS. 4 and 5).

Subsequently, the above members are assembled integrally. Concretely, the deformed part 133 (columnar at this stage) and the insert-through part 132 of the positive connecting member 135 are inserted, from their distal ends, into the through hole 171b of the first insulating member 170, the through hole 113h of the case lid 113, the through hole 183b of the second insulating member 180, and through hole 137b of the positive outer terminal member 137 in this order (see FIGS. 4 and 5). Prior to this insertion, the head portion 139b of the positive fastening member 139 is placed in the head portion placing part 181 of the second insulating member 180 and the shaft portion 139c of the positive fastening member 139 is inserted in the through hole 137c of the positive outer terminal member 137 in advance.

FIG. 5 is a view showing a state in which each member in the same section as in FIG. 2. In this state, as shown in FIGS. 5 and 6, the annular receiving space R1 is formed between the outer tapered surface 175c of the insulating insertion part 175 of the first insulating member 170 and the hole inner peripheral surface 113r defining the through hole 113h of the case lid 113. This receiving space R1 allows the insertion part 175 to be deformed into a shape that reduces the compression stress acting on the insertion part 175 during compression (the compression force applied to the insertion part 175 in the axis AX direction), and receives the resultant extruded portion (the deformed portion 175b, see FIG. 3). The axial length of the insertion part 175 before compression is longer than the length (depth) of the through hole 113h. In this state, a clearance Q is left between the second interposed part 183 of the second insulating member 180 and the upper surface 113p of the case lid 113 (see FIG. 6).

In this state, the deformed part 133 is then deformed by caulking (riveting), pressing the positive outer terminal member 137 downward (toward the seat part 131). Concretely, as the columnar deformed part 133 is crushed downward (toward the seat part 131) into a circular disk shape, the deformed part 133 presses the positive outer terminal member 137 downward (toward the seat part 133).

Accordingly, the second insulating member 180, the case lid 113, and the first insulating member 170 can be fixed while they are held under compression force between the positive outer terminal member 137 and the seat part 131. At that time, the clearance Q is eliminated (or disappears) between the second interposed part 183 and the case lid 113, so that the insulating insertion part 175 of the first insulating member 170 comes to an elastically compressed state in the axial direction (in the vertical direction in FIG. 2) under the compression force with the distal end 175b held in contact (close contact) with the second insulating member 180 (second interposed part 183).

Figure 30:
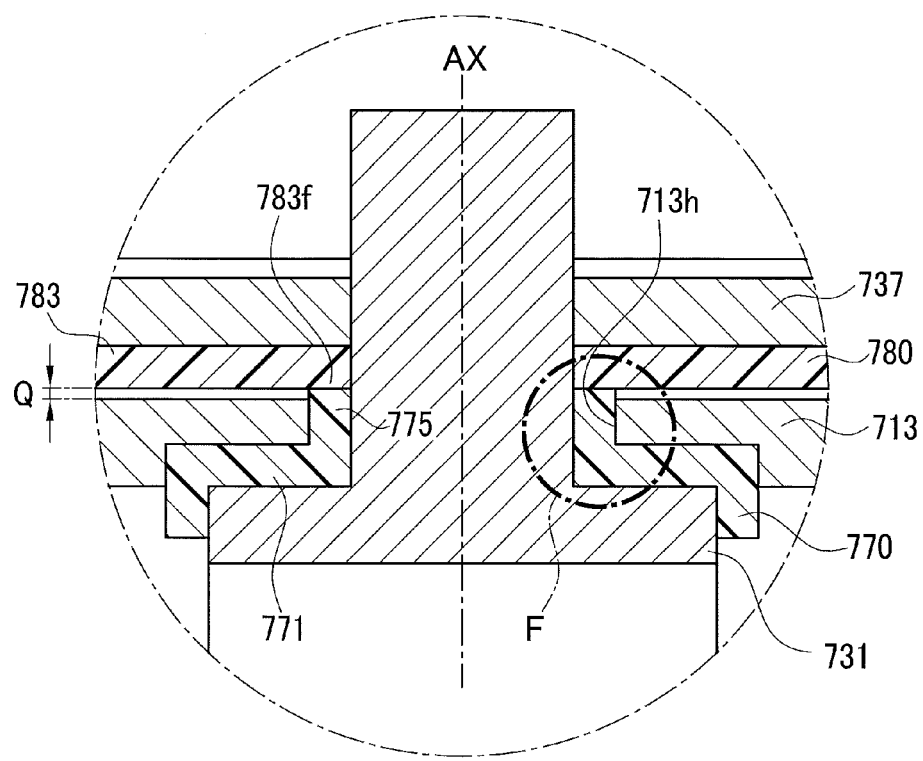
FIG. 30 is an explanatory view of a conventional art.
Figure 31:
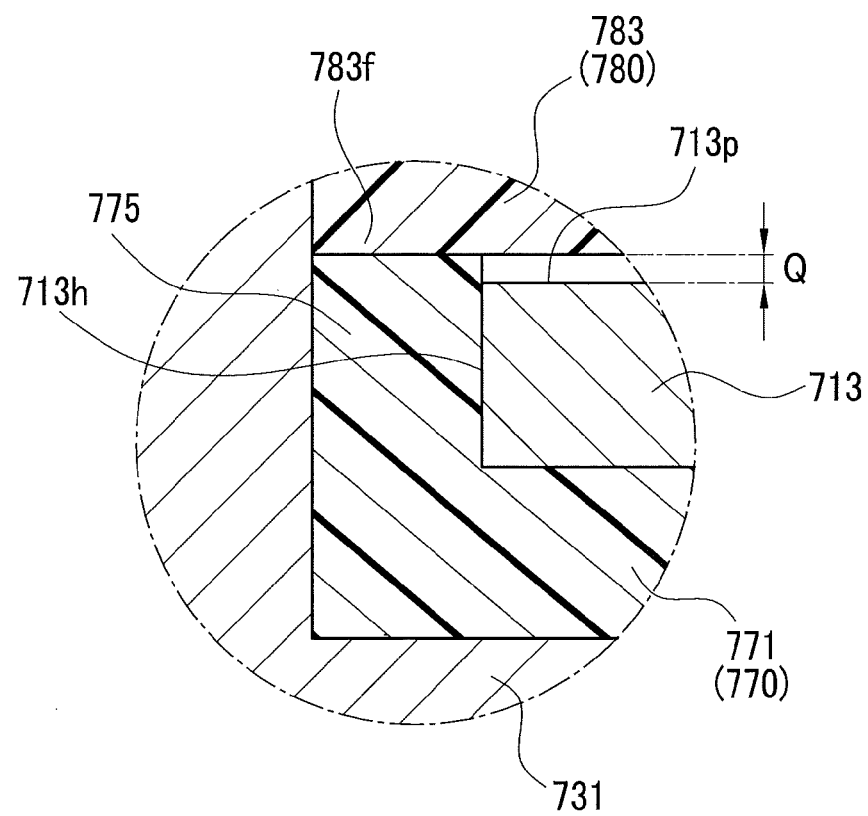
FIG. 31 is an enlarged view of a section F in FIG. 30.

Meanwhile, conventionally, when the second insulating member 780, the case lid 713, and the first insulating member 770 are held between the outer terminal member 737 and the seat part 731 and subjected to the compression force (compression force in the vertical direction in FIGS. 30 and 31), as shown in FIGS. 30 and 31, the insulating insertion part 775 receives much of the compression force (the compression stress acting on the insulating insertion part 775 increases), the first interposed part 771 of the first insulating member 770 could not be appropriately compressed in some cases.

In details, since the insulating insertion part 775 is longer in length than the through hole 713h, before application of the compression force thereto, the clearance Q is left between the second interposed part 783 of the second insulating member 780 and the upper surface 713p of the case lid 713. When the compression force is applied, accordingly, the insertion part 775 is first compressed by receiving the compression force. When the insertion part 775 is compressed until its length becomes equal to the length of the through hole 713h, the second interposed part 783 of the second insulating member 780 comes to contact with the upper surface 713p of the case lid 713. After this state, the first interposed part 771 of the first insulating member 770 starts to be compressed through the second interposed part 783 and the case lid 713.

However, at the time when the insulating insertion part 775 is compressed until its axial length becomes equal to the length of the through hole 713h, the insertion part 775 is subjected to large compression stress (thereby generating large reacting force), and thus the insertion part 775 could not be compressed any more by the compression force (caulking force) in some cases. Thus, the first interposed part 771 of the first insulating member 770 could not be appropriately compressed. This makes it impossible to appropriately seal between the seat part 731 and the case lid 713.

On the other hand, in Example 1 provided with the aforementioned receiving space R1, when the insulating insertion part 715 is compressed as above, a portion including the outer tapered surface 175c, of the insertion part 175, is deformed, or extruded, toward the receiving space R1 (radially outward of the insulating insertion part 175) and received in the receiving space R1 (see FIG. 3). In other words, a portion of the insertion part 175 including the outer tapered surface 175c is deformed in a direction to escape from the compression force (that is, in a direction to reduce the compression stress acting on the insulating insertion part 175) and received in the receiving space R1. This can reduce the compression stress acting on the insulating insertion part 175 (thus, reduce the reaction force of the insulating insertion part 175).

In the above way, even after the insulating insertion part 175 is compressed until its axial length becomes equal to the length of the through hole 113h, the insulating insertion part 175 can be further compressed by the compression force (caulking force). Thus, the first interposed part 171 of the first insulating member 170 can be appropriately compressed through the second interposed part 183 of the second insulating member 180 and the case lid 113. Accordingly, the first interposed part 171 interposed between the seat part 131 and the case lid 113 can be appropriately subjected to the compression force. In other words, the first interposed part 171 of the first insulating member 170 is sandwiched and compressed between the seat part 131 and the case lid 113, thereby ensuring close contact of the first interposed part 171 with the seat part 131 and the case lid 113. This can appropriately seal between the seat part 131 and the case lid 113.

Also, the second interposed part 183 interposed between the positive outer terminal member 137 and the case lid 113 can be appropriately subjected to the compression force. In other words, the second interposed part 183 of the second insulating member 180 can be sandwiched and compressed between the positive outer terminal member 137 and the case lid 113, thereby ensuring close contact of the second interposed part 183 with the positive outer terminal member 137 and the case lid 113. This can appropriately seal between the positive outer terminal member 137 and the case lid 113.

Moreover, the deformed part 143 and the insert-through part 142 of the negative connecting member 145 are inserted, from their distal ends, into the through hole 171b of the first insulating member 170, the through hole 113k of the case lid 113, the through hole 183b of the second insulating member 180, and the through hole 147b of the negative outer terminal member 147 in this order. Prior to this insertion, the head portion 149b of the negative fastening member 149 is placed in the head portion placing part 181 of the second insulating member 180 and the shaft portion 149c of the negative fastening member 149 is inserted in the through hole 147c of the negative outer terminal member 147 in advance.

In this state, as shown in FIGS. 5 and 6, the annular receiving space R1 is formed between the outer tapered surface 175c of the insulating insertion part 175 of the first insulating member 170 and the hole inner peripheral surface 113s defining the through hole 113k of the case lid 113. Since the axial length of the insulating insertion part 175 before compression is longer than the length (depth) of the through hole 113k, the clearance Q is left between the second interposed part 183 of the second insulating member 180 and the upper surface 113p of the case lid 113 (see FIG. 6).

In this state, the deformed part 143 is then deformed by caulking (riveting), pressing the negative outer terminal member 147 downward (toward the seat part 141). Concretely, as the columnar deformed part 143 is crushed downward (toward the seat part 141) into a circular disk shape, the deformed part 143 presses the negative outer terminal member 147 downward (toward the seat part 141).

Accordingly, the second insulating member 180, the case lid 113, and the first insulating member 170 can be fixed while they are held under compression force between the negative outer terminal member 147 and the seat part 141. At that time, the clearance Q is eliminated between the second interposed part 183 and the case lid 113, so that the insulating insertion part 175 of the first insulating member 170 comes to an elastically compressed state in the axial direction (in the vertical direction in FIG. 2) under the compression force with the distal end 175b held in contact (close contact) with the second insulating member 180 (second interposed part 183).

Meanwhile, in Example 1 provided with the aforementioned receiving space R1, when the insulating insertion part 715 is compressed as above, a portion of the insertion part 175 including the outer tapered surface 175c is deformed, or extruded, toward the receiving space R1 (radially outward of the insulating insertion part 175) and received in the receiving space R1 (see FIG. 3). This can reduce the compression stress acting on the insulating insertion part 175 (thus, reduce the reaction force of the insulating insertion part 175). Consequently, the first interposed part 171 of the first insulating member 170 can be appropriately compressed through the second interposed part 183 of the second insulating member 180 and the case lid 113.

Thus, the first interposed part 171 interposed between the seat part 141 and the case lid 113 can be appropriately subjected to the compression force. In other words, the first interposed part 171 of the f insulating member 170 can be sandwiched and compressed between the seat part 141 and the case lid 113, thereby ensuring close contact of the first interposed part 171 with the seat part 141 and the case lid 113. This can appropriately seal between the seat part 141 and the case lid 113.

Also, the second interposed part 183 interposed between the negative outer terminal member 147 and the case lid 113 can be appropriately subjected to the compression force. In other words the second interposed part 183 of the second insulating member 180 can be sandwiched and compressed between the negative outer terminal member 147 and the case lid 113, thereby ensuring close contact of the second interposed part 183 with the negative outer terminal member 147 and the case lid 113. This can appropriately seal between the negative outer terminal member 147 and the case lid 113.

By deforming, or riveting, the deformed part 133, 143 is deformed by caulking as above, the case lid 113, the positive terminal member 130, the negative terminal member 140, the first insulating members 170, 170, and the second insulating members 180, 180 are integrally assembled, forming the terminal-attached lid member 115.

Subsequently, in step S2 (an electrode body forming step), the electrode body 150 is produced. Concretely, the positive mixture layer 152 containing the positive active material 153 is first formed on each surface of the positive substrate 151 made of a strip-shaped aluminum foil to make the positive electrode sheet 155 (see FIG. 8). Separately, the negative mixture layer 159 containing the negative active material 154 is formed on each surface of the negative substrate 158 made of a strip-shaped copper foil to make the negative electrode sheet 156 (see FIG. 9).

Figure 10:
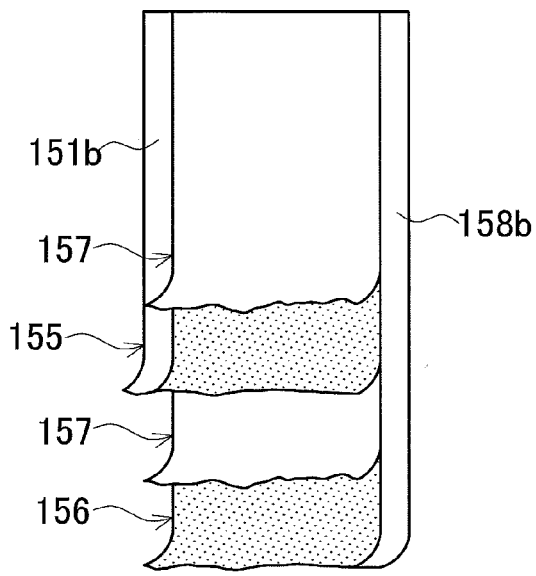
FIG. 10 is a view to explain a process of forming the electrode body.

Thereafter, the negative electrode sheet 156, the separator 157, the positive electrode sheet 155, and the separator 157 are overlapped in this order and wound together (see FIG. 10). In detail, these negative electrode sheet 156, separator 157, positive electrode sheet 155, and separator 157 are wound together in a flattened shape so that the positive mixture layer uncoated portion 15 lb of the positive electrode sheet 155 and the negative mixture layer uncoated portion 158b of the negative electrode sheet 156 are located on opposite sides in the width direction (the lateral direction in FIG. 10). The electrode body 150 is thus produced (see FIG. 7). The number of turns for winding is 30, for example.

In step S3 (a welding step), successively, the electrode body connecting part 134 of the positive connecting member 135 is welded to the positive mixture layer uncoated portion 151b of the electrode body 150. In addition, the electrode body connecting part 144 of the negative connecting member 145 is welded to the negative mixture layer uncoated portion 158b of the electrode body 150. Accordingly, the positive terminal member 130 and the positive electrode sheet 155 are electrically connected to each other and the negative terminal member 140 and the negative electrode sheet 156 are electrically connected to each other, thereby assembling the terminal-attached lid member 115 and the electrode body 150 into one unit.

In step S4 (an enclosing step), the electrode body 150 is enclosed in the case body 111 and then the opening 111d of the case body 111 is closed with the case lid 113. In step S5 (a sealing step), the case lid 113 and the case body 111 in this state are bonded to each other by welding over their entire circumference.

In step S6 (a liquid injecting step), thereafter, an electrolyte (not shown) is injected into the case body 111 through the liquid inlet 113n of the case lid 113, so that the electrolyte is impregnated in the electrode body 150. Then, the liquid inlet 113n of the case lid 113 is sealed with the plug 113m. Through a predetermined process subsequently performed, the battery 100 (see FIG. 1) in Example 1 is completed.

Example 2

A battery 200 (a terminal-attached lid member 215) in Example 2 is identical to the battery 100 (terminal-attached lid member 115) in Example 1 except for the configurations of the insulating insertion part of the first insulating member and the receiving space. Thus, the following explanation is given with a focus on the differences from Example 1 and identical or similar points are not explained or are briefly explained.

Figure 14:
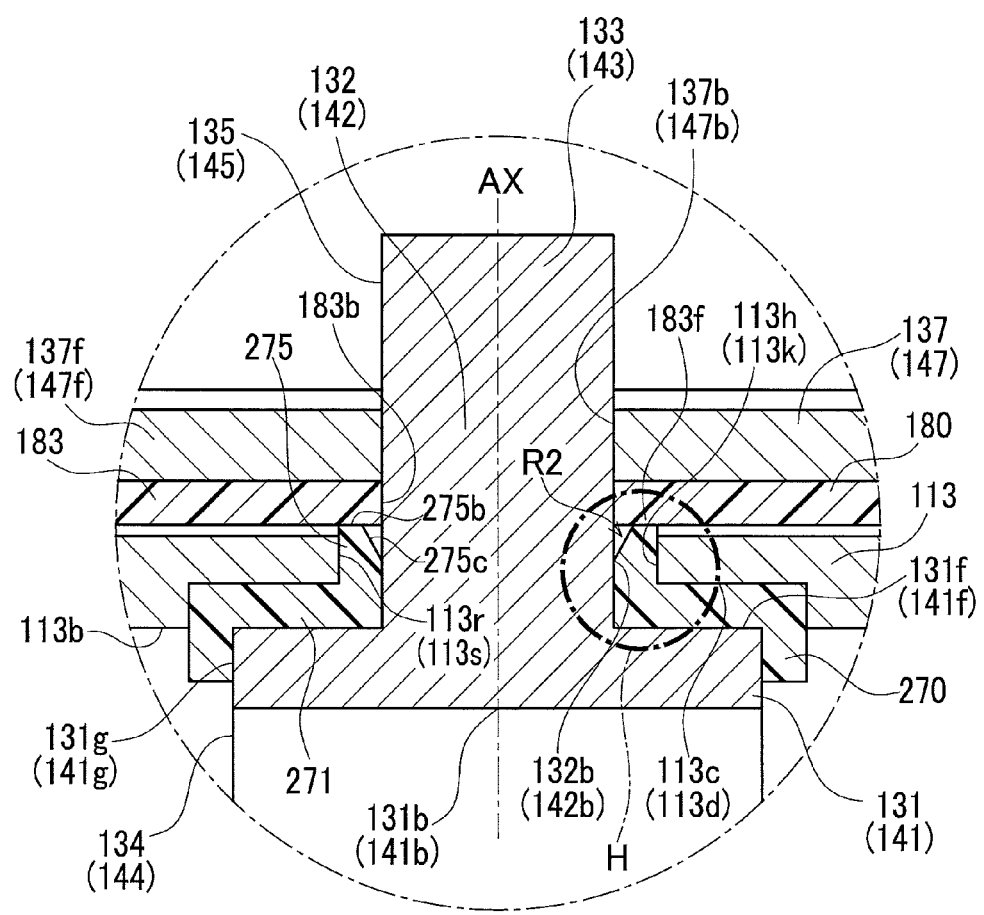
FIG. 14 is a view of the same section as in FIG. 12, showing a state just before a deformed part is deformed by caulking (riveting)
Figure 15:
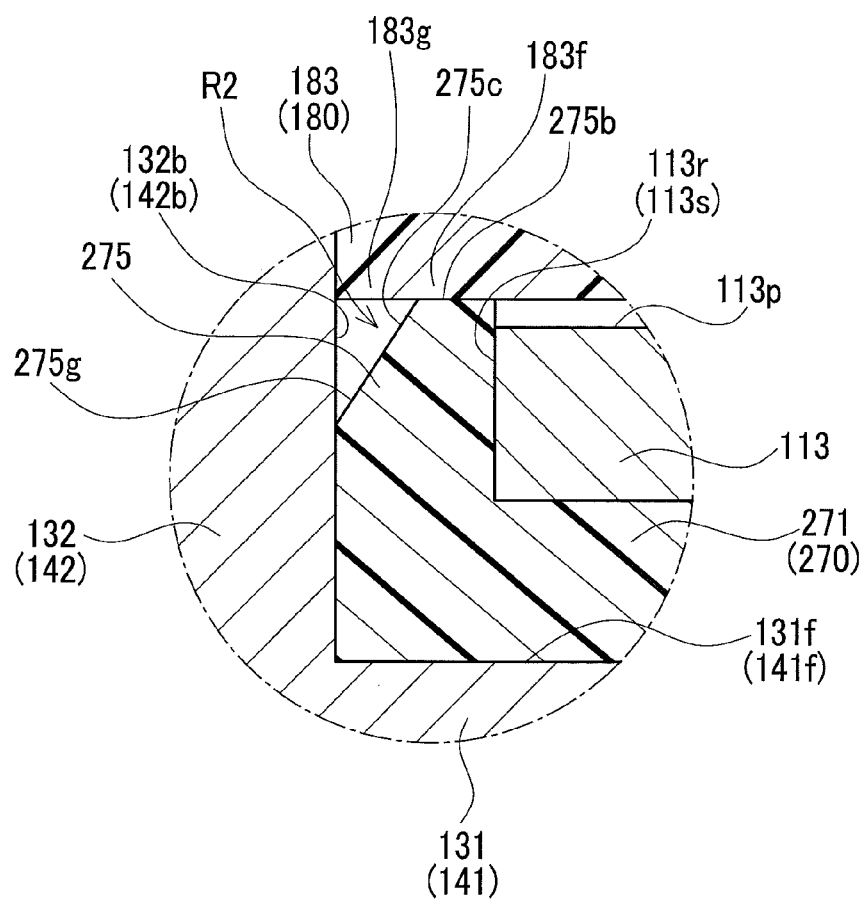
FIG. 15 is an enlarged view of a section H in FIG. 14.

The insulating insertion part 175 in Example 1 has, as mentioned above, the outer peripheral surface 175*f* including the outer tapered surface 175*c* having a diameter decreasing toward the distal end 175*b* of the insertion part 175 before the deformed part 133, 143 is deformed by caulking (before the insertion part 175 is compressed by the compression force) (see FIGS. 5 and 6). In contrast, an insulating insertion part 275 in Example 2 has an inner peripheral surface 275*g* including an inner tapered surface 275*c* having a diameter increasing toward a distal end 275*b* of the insertion part 275 as shown in FIGS. 14 and 15 before the deformed part 133, 143 is deformed by caulking (before the insertion part 275 is compressed by the compression force). A first insulating member 270 (the insertion part 275) is made of resin that is more deformable by compression (softer) in an axial direction than the second insulating member 180.

In Example 2, therefore, before the insulating insertion part 275 is compressed, an annular receiving space R2 is present between the inner tapered surface 275*c* and an outer peripheral surface 132*b* of the insert-through part 132 of the positive connecting member 135 (an outer peripheral surface 142*b* of the insert-through part 142 of the negative connecting member 145). This receiving space R2 allows the insertion part 275 to be deformed into a shape that reduces the compression stress acting on the insertion part 275 when compressed (the compression force applied to the insulating insertion part 275 in the axis AX direction), and receives a resultant extruded portion (a deformed portion 275*d*, see FIGS. 12 and 13).

Figure 12:
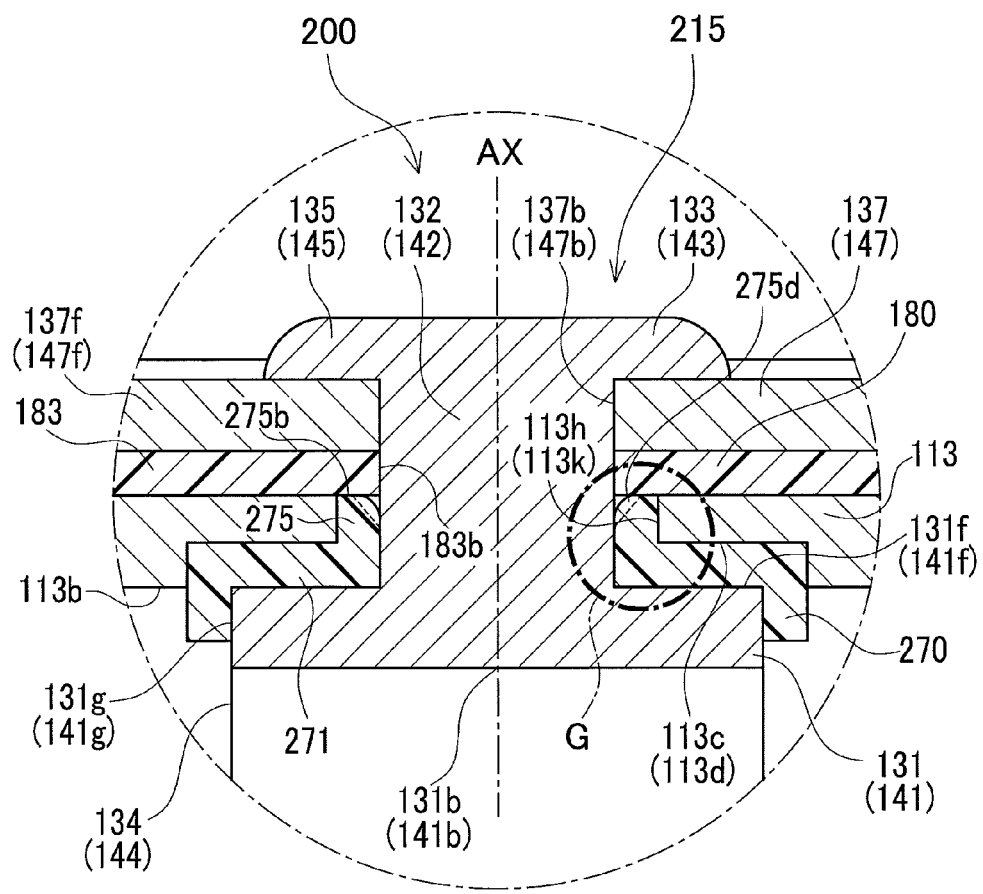
FIG. 12 is an enlarged view of the same section as in FIG. 2 in a battery in Example 2.
Figure 13:
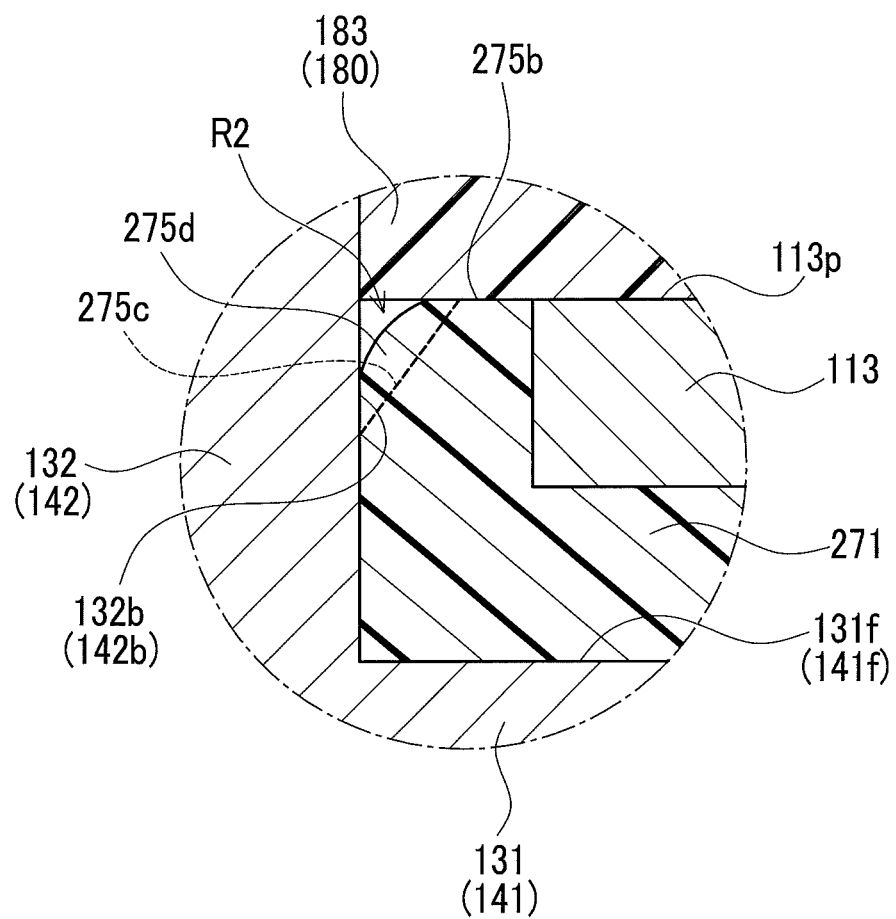
FIG. 13 is an enlarged view of a section G in FIG. 12.

Accordingly, when the insulating insertion part 275 is compressed by the compression force, a portion including the inner tapered surface 275*c*, of this insertion part 275, is deformed toward the receiving space R2 (radially inward of the insulating insertion part 275) and received in the receiving space R2 (see FIGS. 12 and 13). Specifically, a portion of the insulating insertion part 275 including the inner tapered surface 275*c* is deformed in a direction to escape from the compression force (in a direction to reduce the compression stress acting on the insulating insertion part 275) and received in the receiving space R2. This can reduce the compression stress acting on the insulating insertion part 275.

Consequently, in step S1 (a lid assembling step), similarly to Example 1, when the deformed part 133, 143 is deformed by caulking, the compression force can be appropriately applied to the first interposed part 271 interposed between the seat part 131, 141 and the case lid 113. In other words, the first interposed part 271 of the first insulating member 270 can be held and compressed between the seat part 131, 141 and the case lid 113 and thus placed in close contact with the seat part 131, 141 and the case lid 113. This can appropriately seal between the seat part 131, 141 and the case lid 113.

Also, similarly to Example 1, appropriate compression force can be applied to the second interposed part 183 interposed between the positive outer terminal member 137 (negative outer terminal member 147) and the case lid 113. In other words, the second interposed part 183 of the second insulating member 180 can be held and compressed between the positive outer terminal member 137 (negative outer terminal member 147) and thus placed in close contact with the positive outer terminal member 137 (negative outer terminal member 147) and the case lid 113. This can appropriately seal between the positive outer terminal member 137 (negative outer terminal member 147) and the case lid 113.

Example 3

A battery 300 (a terminal-attached lid member 315) in Example 3 is identical to the battery 100 (the terminal-attached lid member 115) in Example 1 except for the configurations of the insulating insertion part of the first insulating member, the case lid, and the receiving space. The following explanation is given with a focus on the differences from Example 1 and similar or identical points are not explained or briefly explained.

The insulating insertion part 175 in Example 1 has, as mentioned above, the outer peripheral surface 175*f* including the outer tapered surface 175*c* having a diameter decreasing toward the distal end 175*b* of the insulating insertion part 175 before the deformed part 133, 143 is deformed by caulking (before the insertion part 175 is compressed by the compression force) (see FIGS. 5 and 6).

Figure 18:
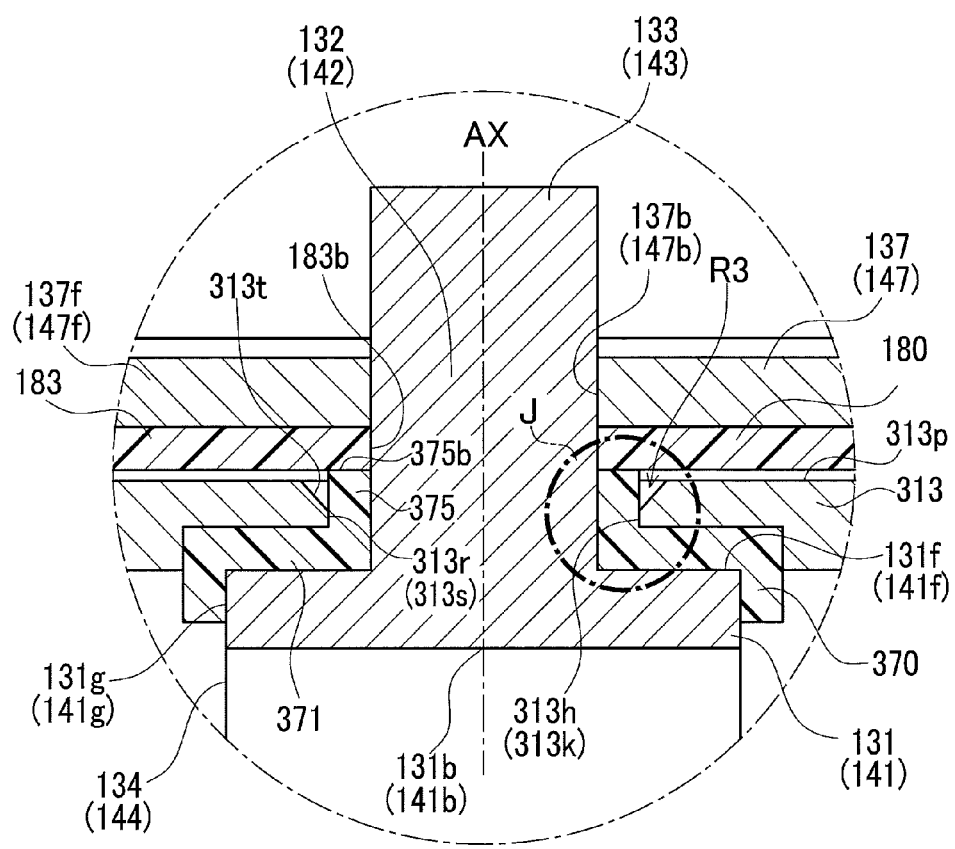
FIG. 18 is a view of the same section as in FIG. 16, showing a state just before a deformed part is deformed by caulking (riveting)
Figure 19:
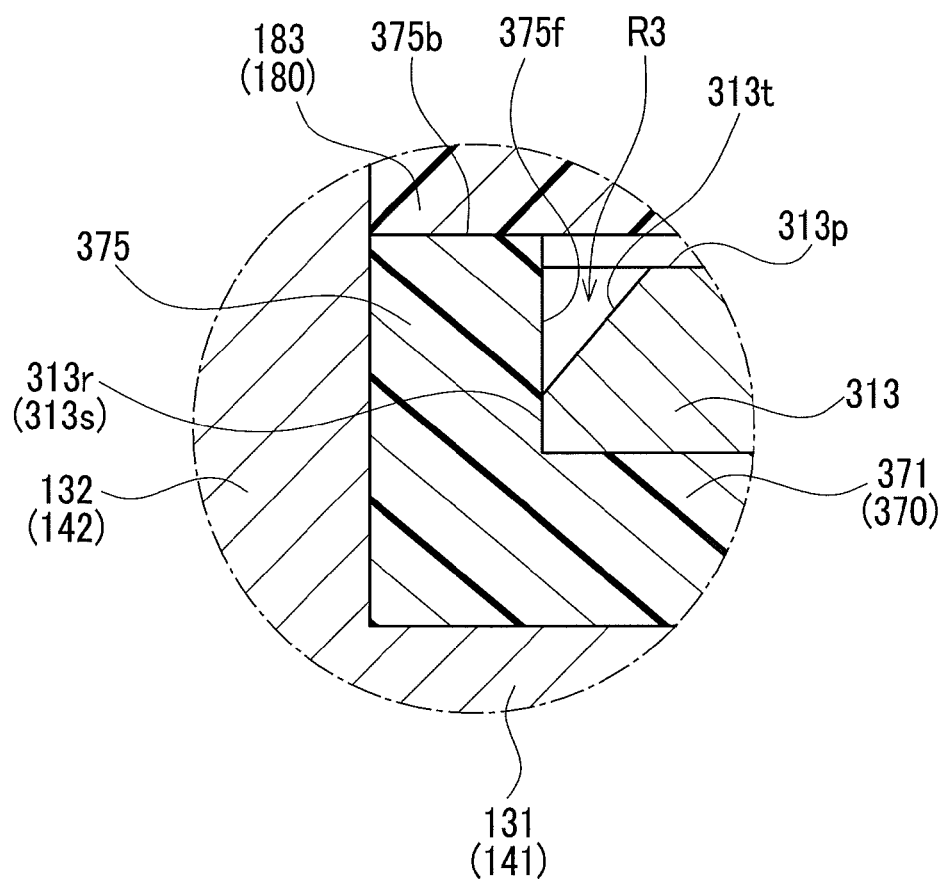
FIG. 19 is an enlarged view of a section J in FIG. 18.

In contrast, an insulating insertion part 375 in Example 3 has a cylindrical shape having a uniform thickness without including a tapered surface and extending in the axial direction (in a direction along the axis AX) as shown in FIGS. 18 and 19 before the deformed part 133, 143 is deformed by caulking (before the insertion part 375 is compressed by the compression force). A first insulating member 370 (the insulating insertion part 375) is made of resin that is more deformable by compression (softer) in the axial direction than the second insulating member 180. A case lid 313 in Example 3, differently from the case lid 113 in Example 1, has a hole inner peripheral surface 313*r* (313*s*) defining a through hole 313*h* (through hole 313*k*) and including a hole tapered surface 313*t* having a diameter increasing toward an upper surface 313*p* of the case lid 313.

In Example 3, therefore, before the insulating insertion part 375 is compressed, an annular receiving space R3 is present between the hole tapered surface 313*t* and an outer peripheral surface 375*f* of the insertion part 375. This allows the insertion part 375 to be deformed into a shape that reduces the compression stress acting on the insertion part 375 when compressed (the compression force applied to the insertion part 375 in the axis AX direction), and receives a resultant extruded portion (a deformed portion 375*d*, see FIGS. 16 and 17).

Figure 16:
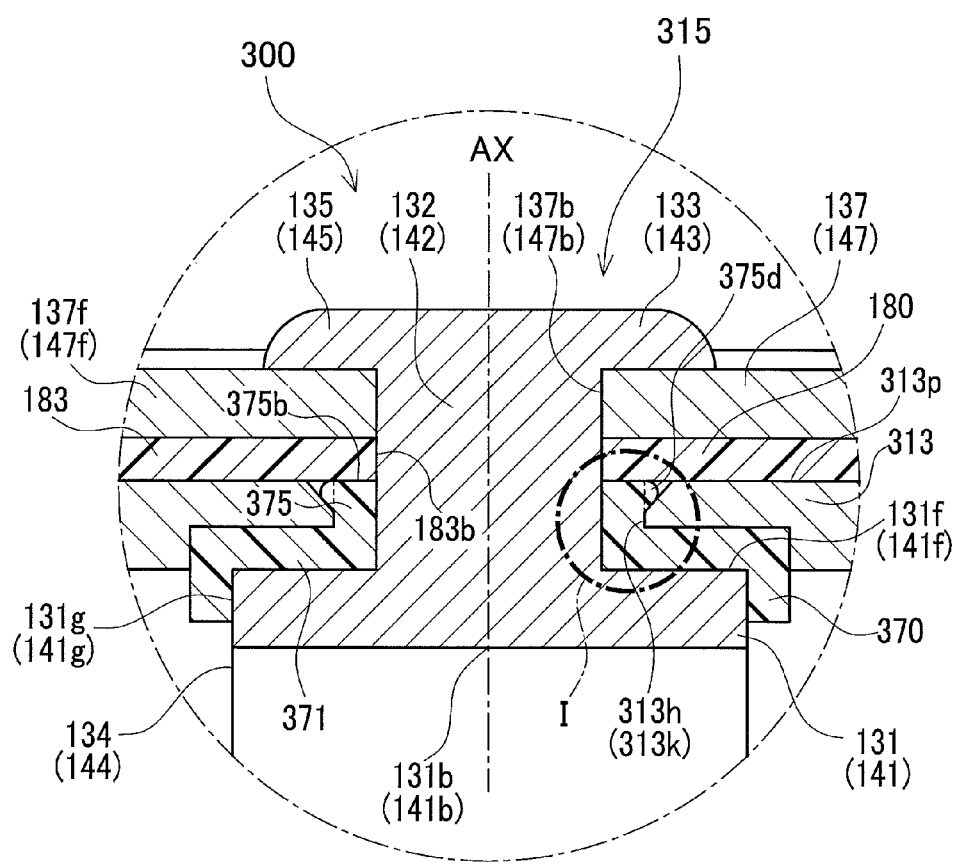
FIG. 16 is an enlarged view of the same section as in FIG. 2 in a battery in Example 3.
Figure 17:
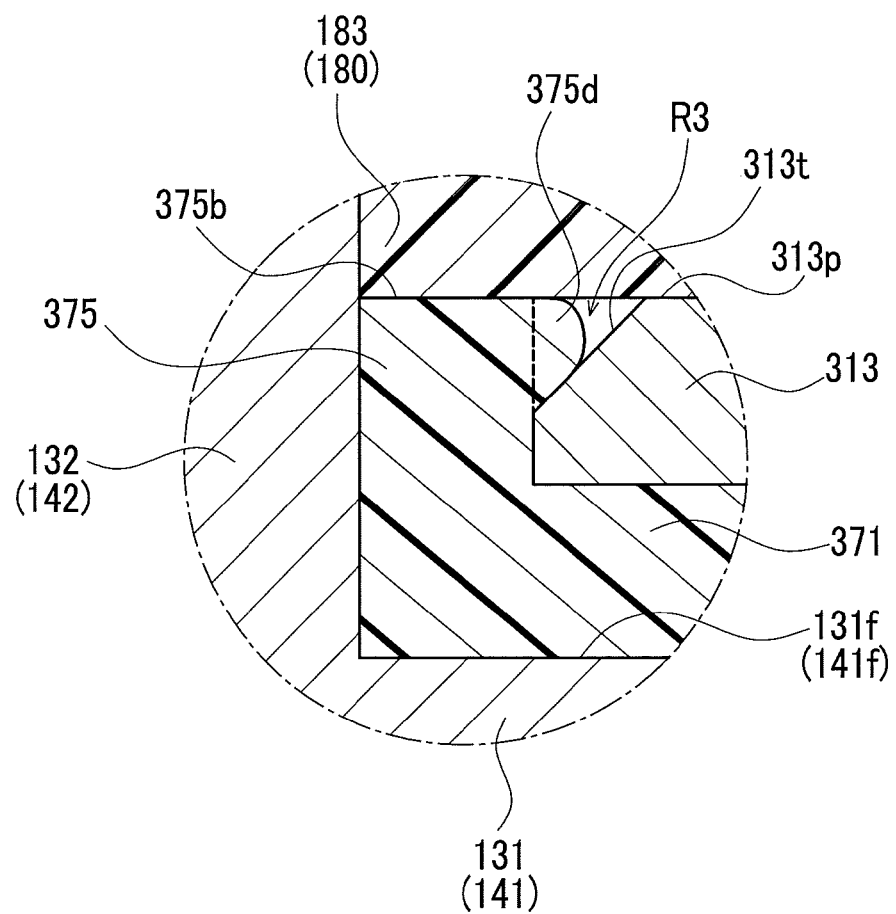
FIG. 17 is an enlarged view of a section I in FIG. 16.

Accordingly, when the insulating insertion part 375 is compressed by the compression force, a part of the insertion part 375 is deformed toward the receiving space R3 (radially outward of the insertion part 375) and received in the receiving space R3 (see FIGS. 16 and 17). In other words, a portion of the insertion part 375 is deformed in a direction to escape from the compression force (that is, in a direction to reduce the compression stress acting on the insertion part 375) and received in the receiving space R3. This can reduce the compression stress acting on the insertion part 375.

Therefore, in step S1 (a lid assembling step), similarly to Example 1, when the deformed part 133, 143 is deformed by caulking (riveting), the compression force can be appropriately applied to the first interposed part 371 interposed between the seat part 131, 141 and the case lid 313. In other words, the first interposed part 371 of the first insulating member 370 can be held and compressed between the seat part 131, 141 and the case lid 313 and thus placed in close contact with the seat part 131, 141 and the case lid 313. This can appropriately seal between the seat part 131, 141 and the case lid 313.

Also, similarly to Example 1, appropriate compression force can be applied to the second interposed part 183 interposed between the positive outer terminal member 137 (negative outer terminal member 147) and the case lid 313. In other words, the second interposed part 183 of the second insulating member 180 can be held and compressed between the positive outer terminal member 137 (negative outer terminal member 147) and the case lid 313 and thus placed in close contact with the positive outer terminal member 137 (negative outer terminal member 147) and the case lid 313. This can appropriately seal between the positive outer terminal member 137 (negative outer terminal member 147) and the case lid 313.

Example 4

A battery 400 (a terminal-attached lid member 415) in Example 4 is identical to the battery 100 (terminal-attached lid member 115) in Example 1 except for the configurations of the insulating insertion part of the first insulating member, the insert-through parts of the positive connecting member and the negative connecting member, and the receiving space. The following explanation is given with a focus on the differences from Example 1 and similar or identical points are not explained or briefly explained.

Example 4 uses the first insulating member 370 identical to that in Example 3. The insulating insertion part 375 of this first insulating member 370 has a cylindrical shape having a uniform thickness and extending in the axial direction (in a direction along the axis AX) as shown in FIGS. 22 and 23 before the deformed part 433, 443 is deformed by caulking (riveting) (before the insertion part 375 is compressed by the compression force).

An insert-through part 432 of the positive connecting member 435 in Example 4 has, different from the insert-through part 132 in Example 1, an outer peripheral surface 432b formed with an insert-through recess 432c recessed radially inward. This recess 432c is formed annularly extending along the entire circumference of the outer peripheral surface 432b of the insert-through part 432. An insert-through part 442 of a negative connecting member 445 in Example 4 also has an outer peripheral surface 442b formed an insert-through recess 442c recessed radially inward. This recess 442c is also formed annularly extending along the entire circumference of the outer peripheral surface 442b of the insert-through part 442 (see FIGS. 22 and 23).

Figure 20:
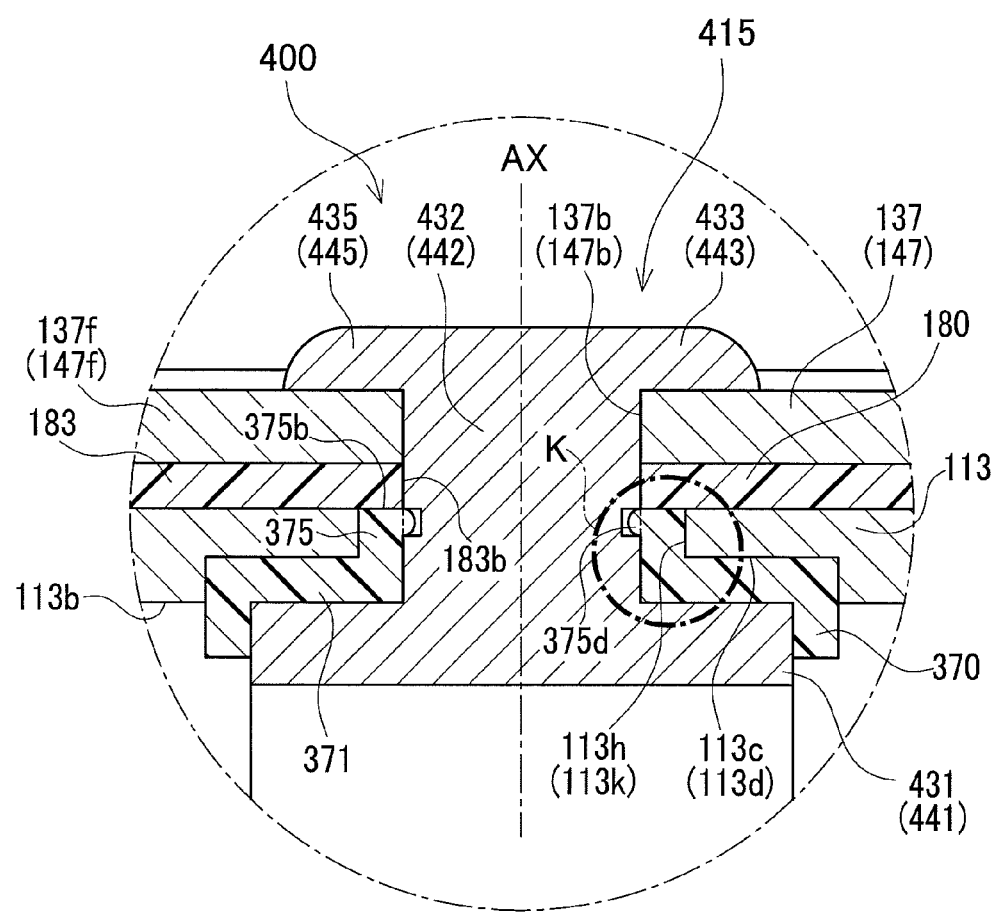
FIG. 20 is an enlarged view of the same section as in FIG. 2 in a battery in Example 4.
Figure 21:
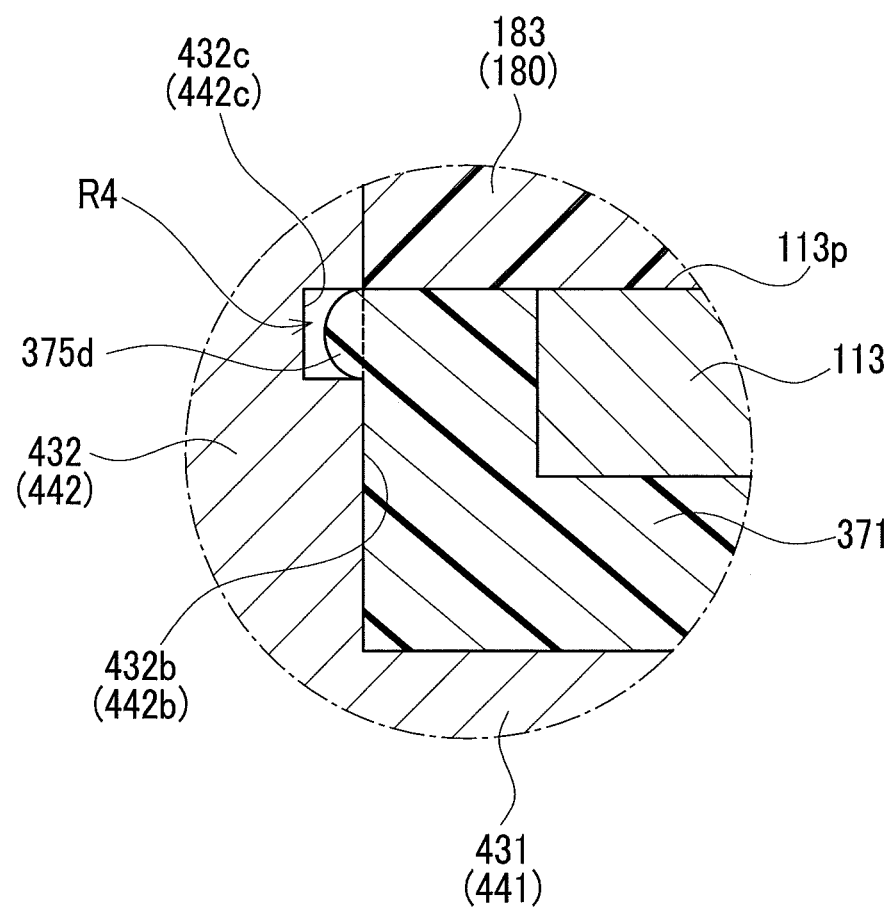
FIG. 21 is an enlarged view of a section K in FIG. 20.
Figure 22:
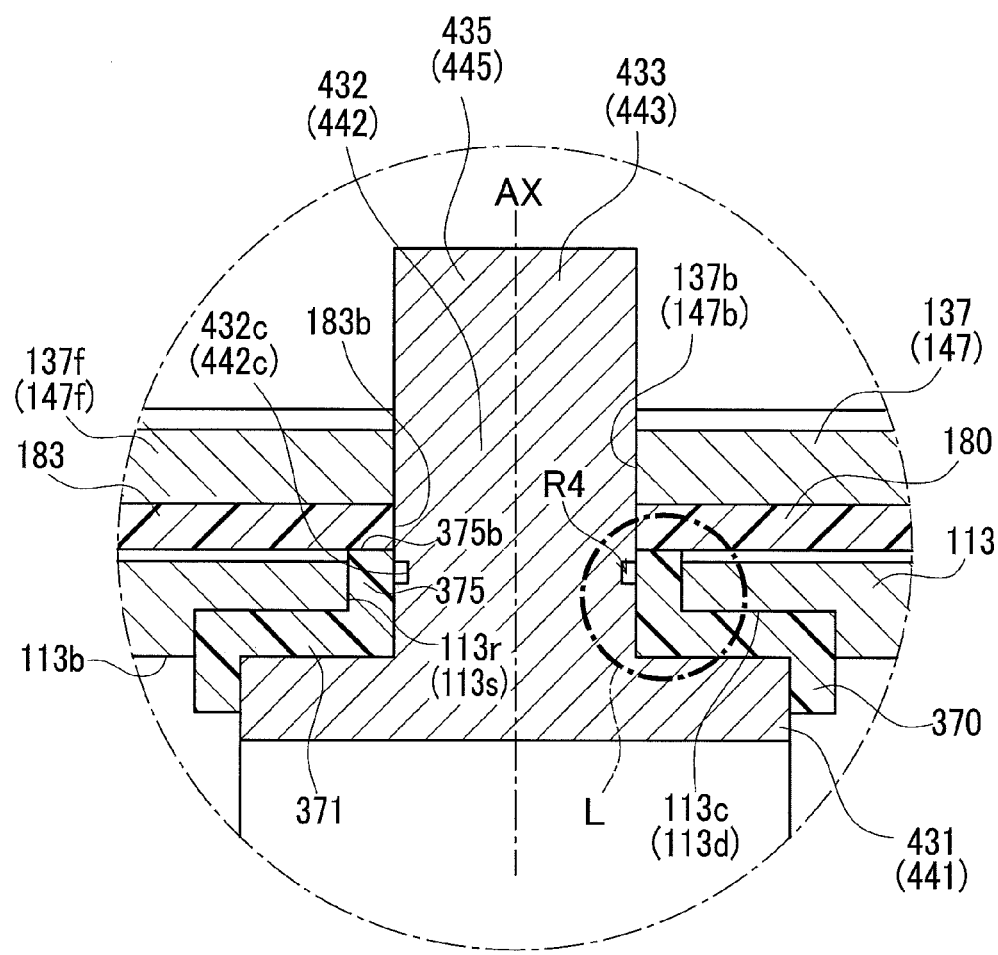
FIG. 22 is a view of the same section as in FIG. 20, showing a state just before a deformed part is deformed by caulking (riveting)
Figure 23:
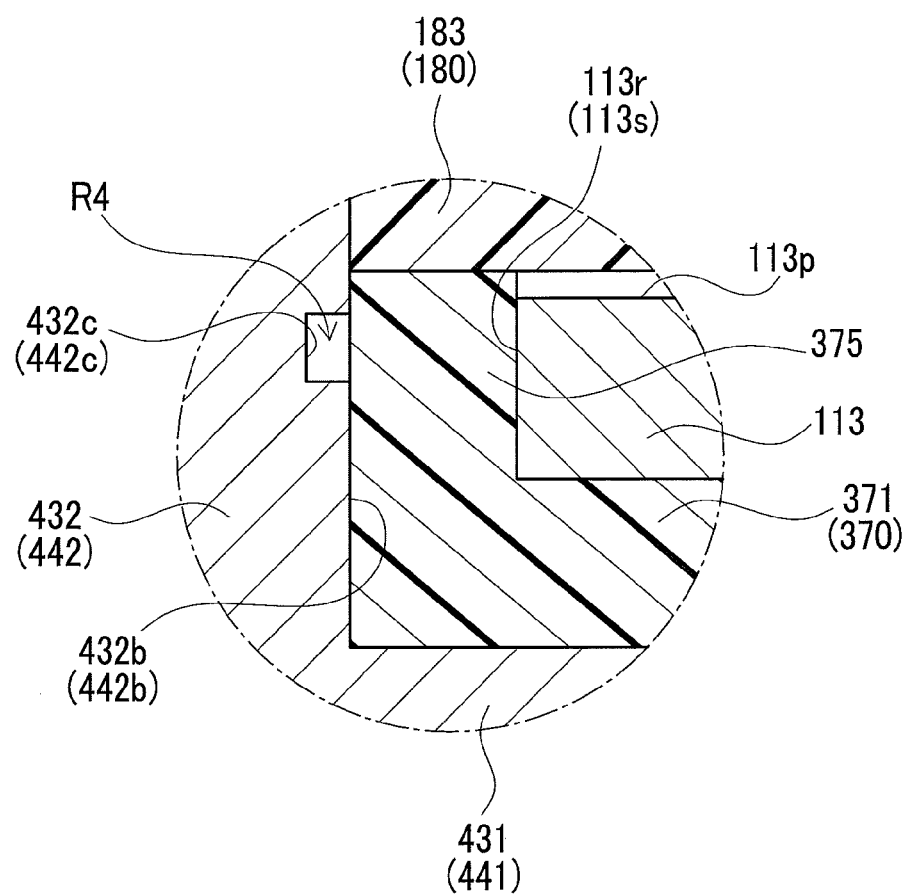
FIG. 23 is an enlarged view of a section L in FIG. 22.

In Example 4, therefore, before the insulating insertion part 375 is compressed, a receiving space R4 is formed by the recess 432c, 442c (see FIGS. 22 and 23). This receiving space R4 (the recess 432c, 442c) allows the insulating insertion part 375 to be deformed into a shape that reduces the compression stress acting on the insertion part 375 when compressed (the compression force applied to the insertion part 375 in the axis AX direction), and receives a resultant extruded portion (a deformed portion 375d) (see FIGS. 20 and 21).

Accordingly, when the insulating insertion part 375 is compressed by the compression force, a portion of the insertion part 375 is deformed toward the receiving space R4 (radially inward of the insulating insertion part 375) and received in the receiving space R4 (see fugs, 20 and 21). In other words, a portion of the insertion part 375 is deformed in a direction to escape from the compression force (that is, in a direction to reduce the compression stress acting on the insulating insertion part 375) and received in the receiving space R4 (i.e., the insert-through recess 432c, 442c). This can reduce the compression stress acting on the insulating insertion part 375.

Therefore, in step S1 (a lid assembling step), similarly to Example 1, when the deformed part 433, 443 is deformed by caulking (riveting), the compression force can be appropriately applied to the first interposed part 371 interposed between the seat part 431, 441 and the case lid 113. In other words, the first interposed part 371 of the first insulating member 370 can be held and compressed between the seat part 431, 441 and the case lid 113 and thus placed in close contact with the seat part 431, 441 and the case lid 113. This can appropriately seal between the seat part 431, 441 and the case lid 113.

Also, similarly to Example 1, appropriate compression force can be applied to the second interposed part 183 interposed between the positive outer terminal member 137 (negative outer terminal member 147) and the case lid 113. In other words, the second interposed part 183 of the second insulating member 180 can be held and compressed between the positive outer terminal member 137 (negative outer terminal member 147) and the case lid 113, and thus placed in close contact with the positive outer terminal member 137 (negative outer terminal member 147) and the case lid 113. This can appropriately seal between the positive outer terminal member 137 (negative outer terminal member 147) and the case lid 113.

Example 5

A battery 500 (a terminal-attached lid member 515) in Example 5 is identical to the battery 100 (terminal-attached lid member 115) in Example 1 except for the configurations of the insulating insertion part of the first insulating member, the second insulating member, and the receiving space. The following explanation is given with a focus on the differences from Example 1 and similar or identical points are not explained or briefly explained.

Example 5 uses the first insulating member 370 identical to that in Example 3. The insulating insertion part 375 of this first insulating member 370 has a cylindrical shape with a uniform thickness and extending in the axial direction (in a direction along the axis AX) as shown in FIGS. 26 and 27 before the deformed part 133, 143 is deformed by caulking (before the insertion part 375 is compressed by the compression force).

Figure 26:
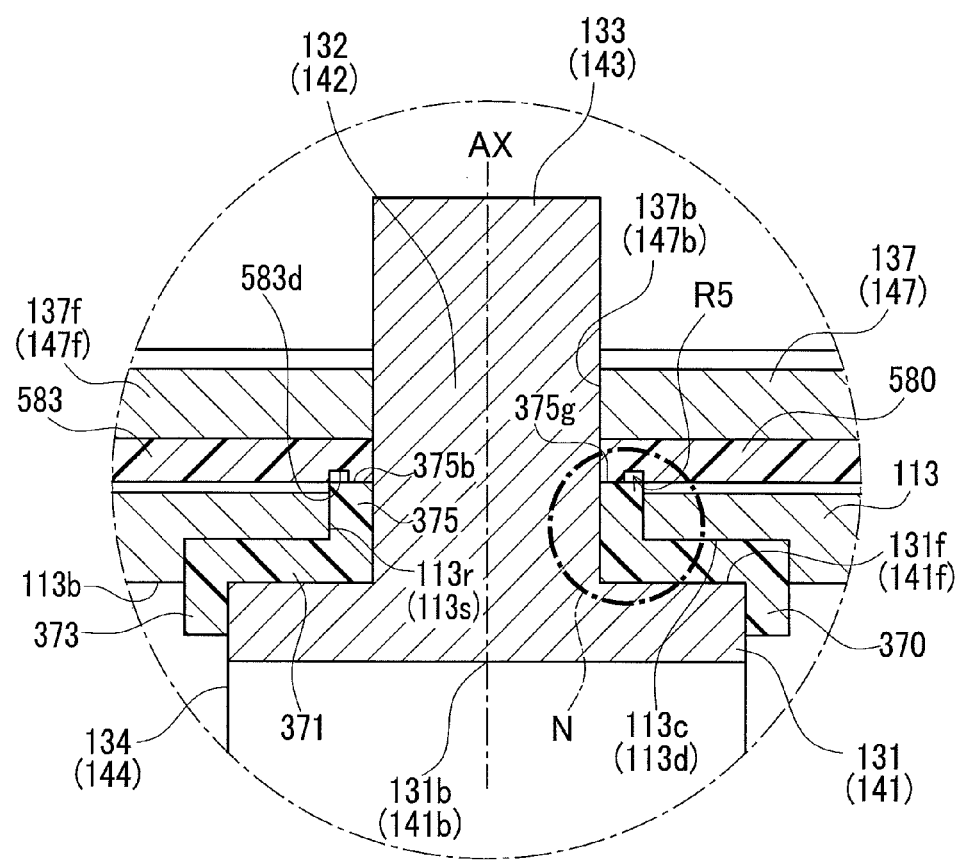
FIG. 26 is a view of the same section as in FIG. 24, showing a state just before a deformed part is deformed by caulking (riveting)
Figure 27:
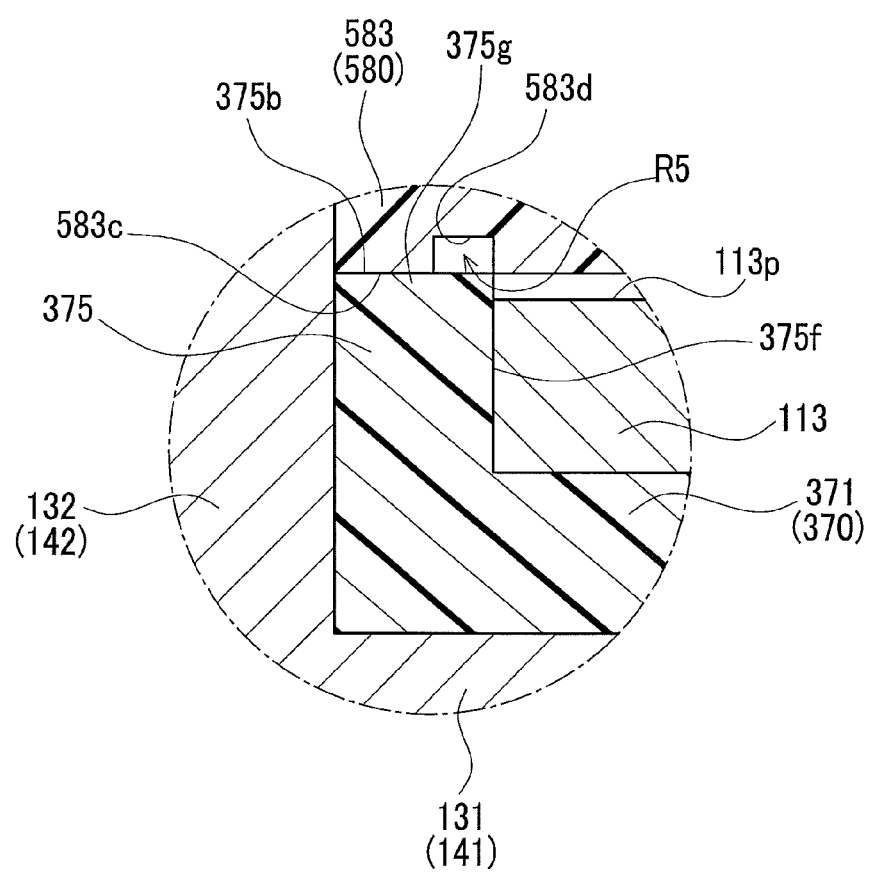
FIG. 27 is an enlarged view of a section N in FIG. 26.

A second insulating member 580 in Example 5 is configured, different from the second insulating member 180 in Example 1, such that a second interposed part 583 includes a facing surface 583c that faces the distal end 375b of the insulating insertion part 375 in the axial direction (in a direction along the axis AX) and includes an insulating recess 583d recessed in the axial direction (upward in FIGS. 26 and 27). This recess 583d is formed in an annular form extending over the entire circumference of the annular facing surface 583c. The first insulating member 370 (insulating insertion part 375) is made of resin that is more deformable by compression (softer) in the axial direction than the second insulating member 580.

Figure 24:
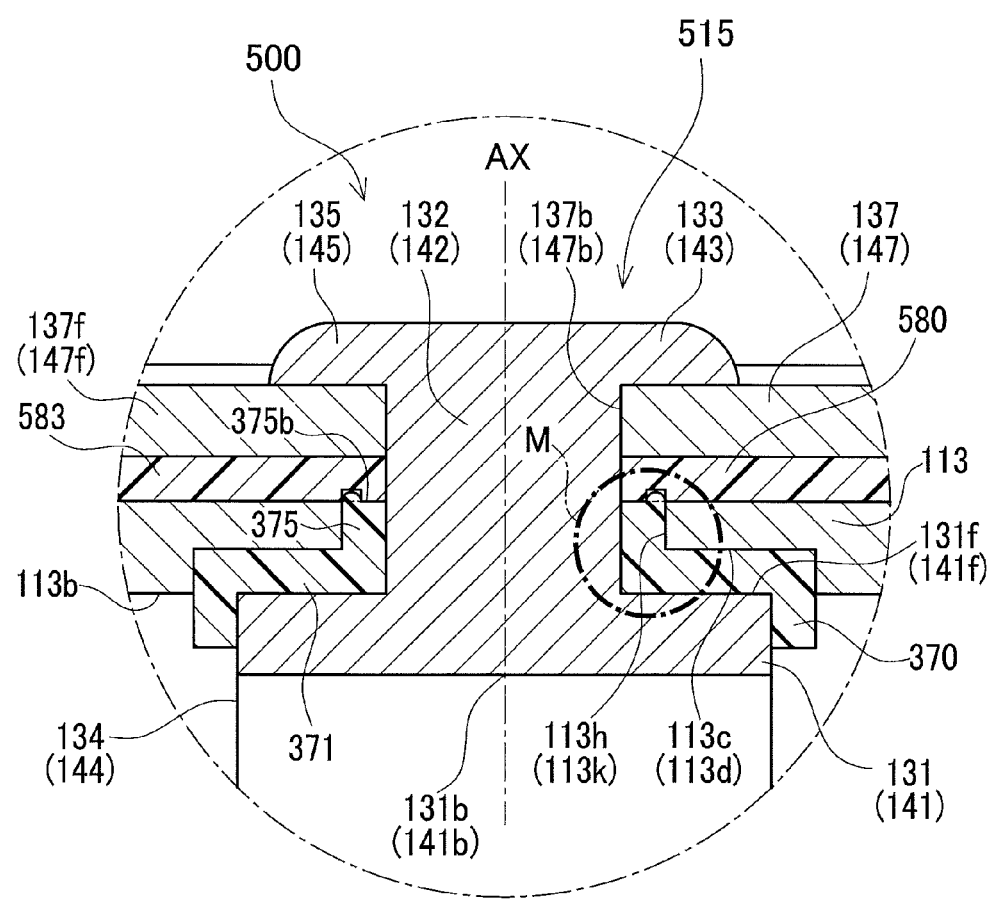
FIG. 24 is an enlarged view of the same section as in FIG. 2 in a battery in Example 5.
Figure 25:
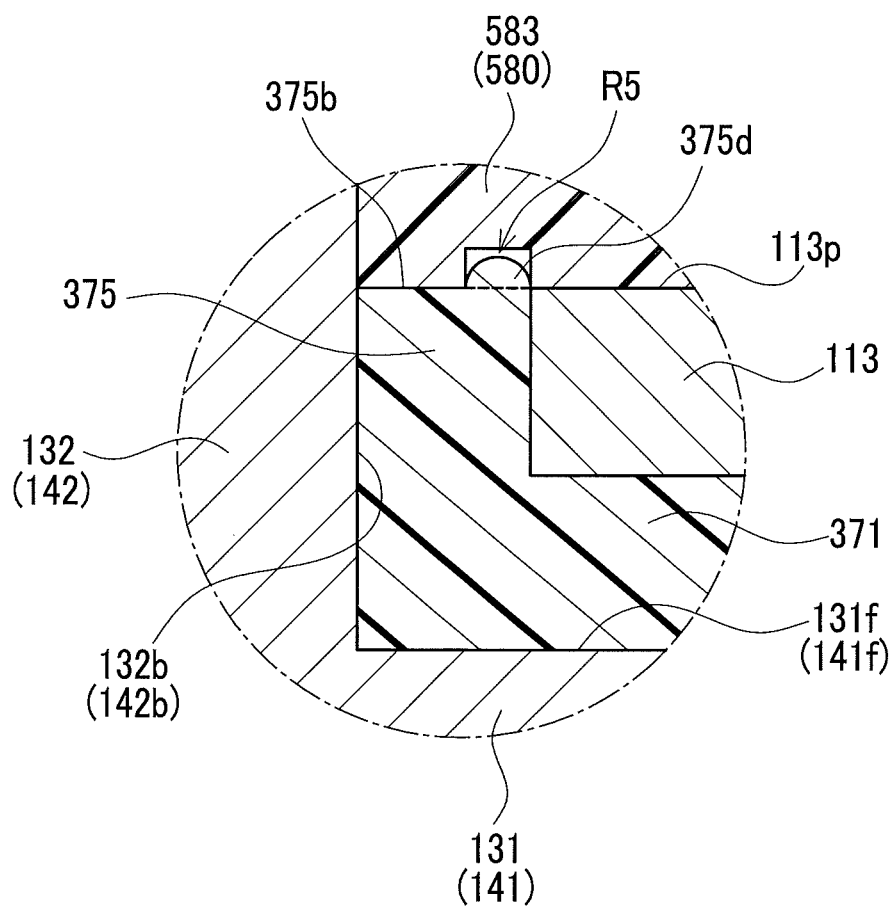
FIG. 25 is an enlarged view of a section M in FIG. 24.

In Example 5, therefore, before the insulating insertion part 375 is compressed, receiving space R5 is formed by the insulating recess 583d (see FIGS. 26 and 27). This receiving space R5 (the recess 583d) allows the insertion part 375 to be deformed into a shape that reduces the compression stress acting on the insertion part 375 (the compression force applied to the insertion part 375 in the axis AX direction)

when compressed, and receives a resultant extruded portion (a deformed portion 375*d*) (see FIGS. 24 and 25).

Accordingly, when the insulating insertion part 375 is compressed by the compression force, a portion of a distal end portion 375*g* of the insertion part 375 is deformed toward the receiving space R5 (toward the insulating recess 583*d*) and received in the receiving space R5 (the recess 583*d*). In other words, a portion of the insertion part 375 is deformed in a direction to escape from the compression force (in a direction to reduce the compression stress acting on the insertion part 375) and received in the receiving space R5 (i.e., the recess 583*d*).

Therefore, in step S1 (a lid assembling step), similarly to Example 1, when the deformed part 133, 143 is deformed by caulking (riveting), the compression force can be appropriately applied to the first interposed part 371 interposed between the seat part 131, 141 and the case lid 113. In other words, the first interposed part 371 of the first insulating member 370 can be held and compressed between the seat part 131, 141 and the case lid 113 and thus placed in close contact with the seat part 131, 141 and the case lid 113. This can appropriately seal between the seat part 131, 141 and the case lid 113.

Also, similarly to Example 1, appropriate compression force can be applied to the second interposed part 583 interposed between the positive outer terminal member 137 (negative outer terminal member 147) and the case lid 113. In other words, the second interposed part 583 of the second insulating member 580 can be held and compressed between the positive outer terminal member 137 (negative outer terminal member 147) and the case lid 113, and thus placed in close contact with the positive outer terminal member 137 (negative outer terminal member 147) and the case lid 113. This can appropriately seal between the positive outer terminal member 137 (negative outer terminal member 147) and the case lid 113.

In the above description, the present invention is explained in Examples 1 to 5 but is not limited to the above examples. The invention may be embodied in other specific forms without departing from the essential characteristics thereof.

In Examples 1 to 5, for instance, the receiving spaces R1 to R5 are formed respectively. As an alternative, the receiving spaces may be combined. To be concrete, for example, a battery may be provided with the receiving spaces R1 and R2. This is configured such that the insulating insertion part includes the outer tapered surface in the outer peripheral surface and also the inner tapered surface in the inner peripheral surface, thereby providing the receiving space R1 between the outer tapered surface and the hole inner peripheral surface of the case lid and also the receiving space R2 between the inner tapered surface and the outer peripheral surface of the insert-through part. As an alternative, a battery may be provided with the receiving spaces R3 and R4. This is configured such that the case lid includes the hole tapered surface in a hole inner peripheral surface and also the insert-through part includes the insert-through recess in the outer peripheral surface, thereby providing the receiving space R3 between the hole tapered surface and the outer peripheral surface of the insulating insertion part and also the receiving space R4 in the insert-through recess.

Examples 1 to 5 exemplify the configurations that the insulating insertion parts 175 to 375 are provided in the first insulating members 170 to 370. As an alternative, the second insulating member may be provided with an insulating insertion part. To be concrete, in Example 1, for instance, the outer tapered surface 175 is provided in the insulating insertion part 175 of the first insulating member 170. Instead of providing the insulating insertion part 175 in the first insulating member 170, alternatively, an insulating insertion part may be provided in the second insulating member 180 to form an outer tapered surface in an outer peripheral surface of the insulating insertion part of the second insulating member 180.

Figure 28:
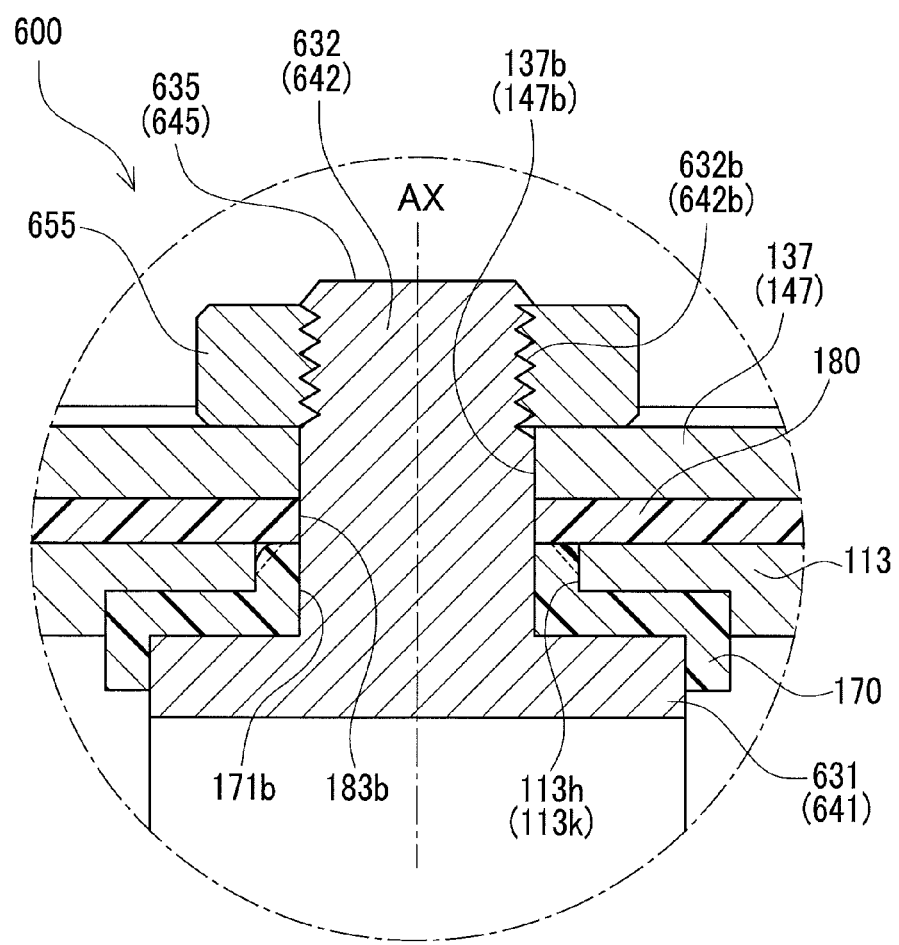
FIG. 28 is an enlarged view of the same section as in FIG. 2 to explain a battery in a first modified example.

In Examples 1 to 5, the deformed part 133, 143 is used as the fixing unit. As an alternative, for example, the fixing unit may be provided as a fixing bolt including a shaft portion with male screw threads and a head portion. In this case, a distal end portion of the insert-through part 132, 142 is formed in a cylindrical shape formed with female screw threads in an inner peripheral surface instead of providing the deformed part 133, 143. More concretely, after the insert-through part 132, 142 is inserted, from its distal end, into the through hole 171*b* of the first insulating member 170, the through hole 113*h*, 113*k* of the case lid 113, the through hole 183*b* of the second insulating member 180, and the through hole 137*b*, 147*b* of the outer terminal member 137, 147 in this order, the male screw threads of the fixing bolt are threaded into the female screw threads of the insert-through part, thereby causing the head portion of the fixing bolt to press the outer terminal member 137, 147 downward (toward the seat part 131, 141). Accordingly, the second insulating member 180, the case lid 113, and the first insulating member 170 can be fixed as being sandwiched under compression force between the outer terminal member 137, 147 and the seat part 131, 141. As a battery 600 in a first modified example shown in FIG. 28, it may be arranged such that a positive connecting member 635 and a negative connecting member 645 are formed with male screw threads 632*b* and 642*b* in outer peripheral surfaces of distal end portions of insert-through parts 632 and 642, respectively, and nuts 655 having female screw threads engageable with the male screw threads 632*b* and 642*b* are used as a fixing unit. More concretely, the insert-through part 632, 642 is inserted, from its distal end, into the through hole 171*b* of the first insulating member 170, the through hole 113*h*, 113*k* of the case lid 113, the through hole 183*b* of the second insulating member 180, and the through hole 137*b*, 147*b* of the outer terminal member 137, 147 in this order so that the male screw threads 632, 642 protrude out of the through hole 137*b*, 147*b* of the outer terminal member 137, 147. In this state, the female screw threads of the nut 655 are threadedly engaged with the male screw threads 632*b*, 642*b* of the insert-through part 632, 642, thereby causing the nut 655 to press the outer terminal member 137, 147 downward (toward the seat part 631, 641). This can fix the second insulating member 180, case lid 113, and first insulating member 170 held under compression force between the outer terminal member 137, 147 and the seat part 631, 641.

Figure 29:
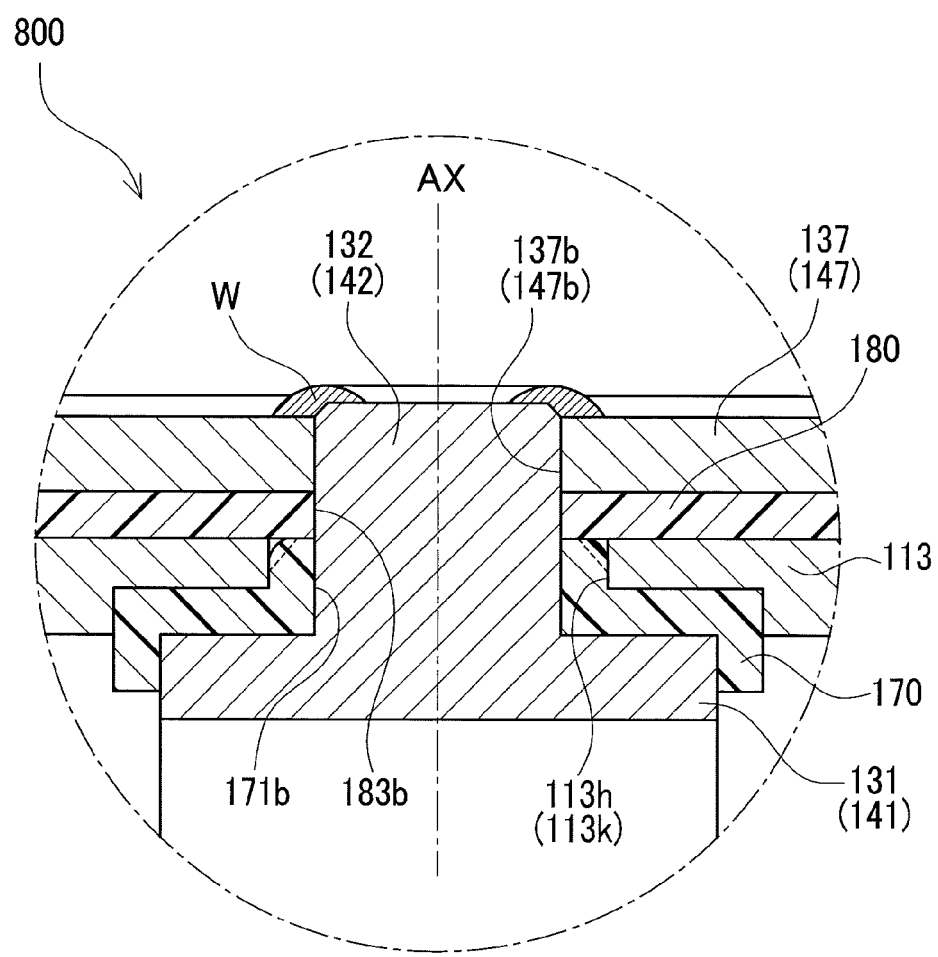
FIG. 29 is an enlarged view of the same section as in FIG. 2 to explain a battery in a second modified example.

As a battery 800 in a second modified example shown in FIG. 29, alternatively, the fixing unit may be provided in the form of a welded part W of the insert-through part 132, 142 and the outer terminal member 137, 147 instead of providing the deformed part 133, 143. Concretely, the insert-through part 132, 142 is inserted, from its distal end, into the through hole 171*b* of the first insulating member 170, the through hole 113*h*, 113*k* of the case lid 113, the through hole 183*b* of the second insulating member 180, and the through hole 137*b*, 147*b* of the outer terminal member 137, 147, and then, while the second insulating member 180, the case lid 113, and the first insulating member 170 are held under compression force between the outer terminal member 137, 147, and the seat part 131, 141, the insert-through part 132, 142 and the outer terminal member 137, 147 are welded to each other (e.g., welding over the entire circumference) (thereby forming the welded part W) to fix them.

In Example 2, before the insulating insertion part 275 is compressed, the receiving space R2 is formed between the inner tapered surface 275c and the outer peripheral surface 132b of the insert-through part 132 of the positive connecting member 135 (outer peripheral surface 142b of the insert-through part 142 of the negative connecting member 145) (see FIGS. 14 and 15). In Example 2, this receiving space R2 allows the insulating insertion part 275 to be deformed into a shape that reduces the compression stress acting on the insulating insertion part 275 when compressed (the compression force applied to the insulating insertion part 275 in the axis AX direction) and receive the resultant extruded portion (the deformed portion 275d, see FIGS. 12 and 13).

However, this receiving space R2 may be configured to allow the second interposed part 183 of the second insulating member 180 (particularly, an insulating contact part 183f (a portion of the second interposed part 183 of the second insulating member 180, which contacts with the distal end 275b of the insulating insertion part 275) and an insulating adjacent part 183g adjacent on a radially inward side to the contact part 183f) to be deformed into a shape that reduces the compression stress acting on the insulating contact part 183f when the insulating contact part 183f is compressed, thereby receiving a resultant extruded portion. The insulation adjacent part 183g corresponds to a portion exposed to (facing) the receiving space R2.

The above configuration may be applied to, for example, when the insulating contact part 183f is to be compressed, thereby making the second interposed part 183 of the second insulating member 180 contact (close contact) with the upper surface 113p of the case lid 113, and the first interposed part 271 of the first insulating member 270 is to be compressed through the second interposed part 183 and the case lid 113. In this case, the second insulating member 180 is preferably made of resin more deformable by compression (softer) in the axial direction than the first insulating member 270 (insulating insertion part 275).

In this case, conventionally, the insulating contact part 783f of the second insulating member 780 receives much of the compression force (the compression stress acting on the insulating contact part 783f increases), and thus the first interposed part 771 of the first insulating member 770 could not be appropriately compressed (see FIGS. 30 and 31). In detail, before the second interposed part 783 comes into close contact with the upper surface 713p of the case lid 713 and the first interposed part 771 is subjected to the compression stress, the insulating contact part 783f is in a state subjected to large compression stress (thereby generating large reaction force), the insulating contact part 783f could not be compressed any more by the compression force (caulking force). Thus, the first interposed part 771 could not be appropriately compressed in some cases.

In contrast, when the aforementioned receiving space R2 is provided in advance, when the insulating contact part 183f is compressed, the receiving space R2 can receive a part of the second interposed part 183 (the deformed portion) and reduce the compression stress acting on the insulating contact part 183f. This makes it possible to bring the second interposed part 183 of the second insulating member 180 in contact (close contact) with the upper surface 113p of the case lid 113 and also compress the first interposed part 271 of the first insulating member 270 through the second interposed part 183 and the case lid 113.

Accordingly, as in Example 1, in step S1 (a lid assembling step), when the deformed part 133, 143 is deformed by caulking (riveting), the compression force can be appropriately applied to the first interposed part 271 interposed between the seat part 131, 141 and the case lid 113. In other words, the first interposed part 271 of the first insulating member 270 can be held and compressed between the seat part 131, 141 and the case lid 113 and thus placed in close contact with the seat part 131, 141 and the case lid 113. This can appropriately seal between the seat part 131, 141 and the case lid 113.

Further, as in Example 1, the compression force can also be applied to the second interposed part 183 interposed between the positive outer terminal member 137 (negative outer terminal member 147) and the case lid 113. In other words, the second interposed part 183 of the second insulating member 180 can be held and compressed between the positive outer terminal member 137 (negative outer terminal member 147) and the case lid 113 and thus placed in close contact with the positive outer terminal member 137 (negative outer terminal member 147) and the case lid 113. This can appropriately seal between the positive outer terminal member 137 (negative outer terminal member 147) and the case lid 113.

In Example 4, as the receiving space R4 for receiving part of the insulating insertion part 375 (deformed portion 375d), the insert-through recess 432c, 442c is formed in the outer peripheral surface 432b, 442b of the insert-through part 432, 442 (see FIGS. 22 and 23). However, in addition to or instead of this, another insert-through recess, configured like the insert-through recess 432c, 442c, may be formed as second receiving space for receiving part of the second interposed part 183 (a deformed part) in a portion of the outer peripheral surface 432b, 442b of the insert-through part 432, 442, which faces to the hole inner peripheral surface defining the through hole 183b of the second interposed part 183. When the insulating contact part (a portion of the second insulating member 180 which contacts with the distal end 375b of the insulating insertion part 375) is compressed, accordingly, part of the second interposed part 183 (the deformed part) can be received in the second receiving space, thereby reducing the compression stress acting on the insulating contact part.

In Example 1, the outer tapered surface 175c is formed in the outer peripheral surface 175f of the insulating insertion part 175 and the receiving space R1 is formed between the outer tapered surface 175c and the hole inner peripheral surface 113r (113s) of the case lid 113. As an alternative, the outer peripheral surface 175f (a part thereof) is not limited to a tapered surface but may be formed in any shape capable of forming receiving space between the outer peripheral surface 175f and the hole inner peripheral surface 113r (113s) of the case lid 113. The same applies to Examples 2 and 3.

In Example 4, the receiving space R4 is formed as the annular insert-through recess 432c recessed radially inward in the outer peripheral surface of the insert-through part 432. However, the receiving space R4 is not limited to such a configuration (the annular recess). As an alternative, the outer peripheral surface 432b of the insert-through part 432 may be designed suitably to form the receiving space between the outer peripheral surface 432b of the insert-through part 432 and the insulating insertion part 375. The same applies to Example 5 (not limited to the annular recess).

REFERENCE SIGNS LIST 100, 200, 300, 400, 500, 600, 800 Battery
110 Battery case
111 Case body
111b Bottom
111d Opening
113, 313 Case lid
113b Lower surface
113h, 113k, 313h, 313k Through hole
113p, 313p Upper surface
113r, 113s, 313r, 313s Hole inner peripheral surface
115, 215, 315, 415, 515 Terminal-attached lid member
130 Positive terminal member (Electrode terminal member)
131, 141, 431, 441, 631, 641 Seat part
131b, 141b Lower surface
131f, 141f Upper surface
131g, 141g Outer peripheral surface
132, 142, 432, 442, 632, 642 Insert-through part
132b, 142b, 432b, 442b Outer peripheral surface
133, 143, 433, 443 Deformed part (Fixing unit)
134, 144 Electrode body connecting part
135, 435, 635 Positive connecting member (Electrode connecting member)
137 Positive outer terminal member (outer terminal member)
139 Positive fastening member
140 Negative terminal member (Electrode terminal member)
145, 445, 645 Negative connecting member (Electrode connecting member)
147 Negative outer terminal member (Outer terminal member)
149 Negative fastening member
150 Electrode body
155 Positive electrode sheet
156 Negative electrode sheet
157 Separator
170, 270, 370 First insulating member
171, 271, 371 First interposed part
171b Through hole
175, 275, 375 Insulating insertion part
175b, 275b, 375b Distal end
175c Outer tapered surface
175d, 275d, 375d Deformed portion
175f, 375f Outer peripheral surface
180, 580 Second insulating member
183, 583 Second interposed part
183f Insulation contact part
275c Inner tapered surface
275g Inner peripheral surface
313t Hole tapered surface
375g Distal end portion
432c, 442c Insert-through recess
583c Facing surface
583d Insulating recess
655 Nut (Fixing unit)
W Weld portion (Fixing unit)
R1, R2, R3, R4, R5 Receiving space

The invention claimed is:

1. A battery comprising:
a box-shaped case body having an opening;
an electrode body enclosed in the case body;
a plate-shaped case lid closing the opening of the case body;
an electrode connecting member including a seat part located in the case body, an insert-through part having a columnar shape protruding from an upper surface of the seat part and extending through a through hole formed in the case lid to the outside, and an electrode body connecting part extending from a lower surface of the seat part toward a bottom of the case body, and configured to electrically connect to the electrode;
a first insulating member having an electrically insulating property and including a first interposed part interposed between the upper surface of the seat part and a lower surface of the case lid;
an outer terminal member located outside the case body and on an upper surface side of the case lid, and configured to electrically connect to the electrode connecting member;
a second insulating member having an electrically insulating property and including a second interposed part interposed between the outer terminal member and the upper surface of the case lid; and
a fixing unit to fix the second insulating member, the case lid, and the first insulating member held under compression force between the outer terminal member and the seat part,
wherein one of the first insulating member and the second insulating member includes an insulating insertion part having a cylindrical shape and being inserted in the through hole of the case lid to surround the insert-through part of the electrode connecting member, the insulating insertion part having a distal end held in contact with an insulating contact part of the other insulating member,
at least one of the insulating insertion part and the insulating contact part is in a compressed state by the compression force in an axial direction of the insulating insertion part,
before at least one of the insulating insertion part and the insulating contact part is compressed by the compression force, at least one of the first insulating member, the second insulating member, the case lid, and the insert-through part provides at least either one of a receiving space allowing the insulating insertion part to be deformed into a shape that reduces compression stress acting on the insulating insertion part when the insulating insertion part is compressed and receiving a resultant deformed portion and a receiving space allowing the insulating member including the insulating contact part to be deformed into a shape that reduces compression stress acting on the insulating contact part when the insulating contact part is compressed and receiving a resultant deformed portion, and
the deformed portion of at least one of the insulating insertion part and the insulating contact part compressed by the compression force is received in the receiving space,
wherein the insulating insertion part before being compressed by the compression force has an outer peripheral surface including an outer tapered surface having a diameter decreasing toward the distal end of the insulating insertion part,
before the insulating insertion part is compressed, the receiving space is formed between the outer tapered surface and a hole inner peripheral surface defining the through hole of the case lid, to allow the insulating insertion part to be deformed into a shape that reduces the compression stress acting on the insulating insertion part when the insulating insertion part is compressed and receiving a resultant deformed portion, and a portion including the outer tapered surface, of the insulating insertion part compressed by the compression force, is deformed toward and received in the receiving space.

2. A battery comprising:

a box-shaped case body having an opening;

an electrode body enclosed in the case body;

a plate-shaped case lid closing the opening of the case body;

an electrode connecting member including a seat part located in the case body, an insert-through part having a columnar shape protruding from an upper surface of the seat part and extending through a through hole formed in the case lid to the outside, and an electrode body connecting part extending from a lower surface of the seat part toward a bottom of the case body, and configured to electrically connect to the electrode;

a first insulating member having an electrically insulating property and including a first interposed part interposed between the upper surface of the seat part and a lower surface of the case lid;

an outer terminal member located outside the case body and on an upper surface side of the case lid, and configured to electrically connect to the electrode connecting member;

a second insulating member having an electrically insulating property and including a second interposed part interposed between the outer terminal member and the upper surface of the case lid; and a fixing unit to fix the second insulating member, the case lid, and the first insulating member held under compression force between the outer terminal member and the seat part, wherein one of the first insulating member and the second insulating member includes an insulating insertion part having a cylindrical shape and being inserted in the through hole of the case lid to surround the insert-through part of the electrode connecting member, the insulating insertion part having a distal end held in contact with an insulating contact part of the other insulating member, at least one of the insulating insertion part and the insulating contact part is in a compressed state by the compression force in an axial direction of the insulating insertion part, before at least one of the insulating insertion part and the insulating contact part is compressed by the compression force, at least one of the first insulating member, the second insulating member, the case lid, and the insert-through part provides at least either one of a receiving space allowing the insulating insertion part to be deformed into a shape that reduces compression stress acting on the insulating insertion part when the insulating insertion part is compressed and receiving a resultant deformed portion and a receiving space allowing the insulating member including the insulating contact part to be deformed into a shape that reduces compression stress acting on the insulating contact part when the insulating contact part is compressed and receiving a resultant deformed portion, and the deformed portion of at least one of the insulating insertion part and the insulating contact part compressed by the compression force is received in the receiving space, wherein the insulating insertion part before being compressed by the compression force has an inner peripheral surface including an inner tapered surface having a diameter increasing toward the distal end of the insulating insertion part, before the insulating insertion part is compressed, the receiving space is formed between the inner tapered surface and the insert-through part of the electrode connecting member to allow the insulating insertion part to be deformed into a shape that reduces the compression stress acting on the insulating insertion part when the insulating insertion part is compressed and receiving a resultant deformed portion, and a portion including the inner tapered surface, of the insulating insertion part compressed by the compression force, is deformed toward and received in the receiving space.

3. The battery according to claim 1, wherein a hole inner peripheral surface defining the through hole of the case lid includes a hole tapered surface having a diameter increasing toward the upper surface of the case lid, before the insulating insertion part is compressed, the receiving space is formed between the hole tapered surface and the outer peripheral surface of the insulating insertion part to allow the insulating insertion part to be deformed into a shape that reduces the compression stress acting on the insulating insertion part when the insulating insertion part is compressed and receiving a resultant deformed portions, and a portion of the insulating insertion part compressed by the compression force is deformed toward and received in the receiving space.

4. The battery according to claim 1, wherein an outer peripheral surface of the insert-through part of the connecting member includes an insert-through recess recessed radially inward, the insert-through recess forms the receiving space allowing the insulating insertion part to be deformed into a shape that reduces the compression stress acting on the insulating insertion part when the insulating insertion part is compressed and receiving a resultant deformed portion, and a portion of the insulating insertion part compressed by the compression force is deformed toward and received in the insert-through recess.

5. The battery according to claim 1, wherein one of the first insulating member and the second insulating member, which does not include the insulating insertion part, has a facing surface that faces the distal end of the insulating insertion part in the axial direction, the facing surface including an insulating recess recessed in the axial direction before the insulating insertion part is compressed, before the insulating insertion part is compressed, the insulating recess forms the receiving space allowing the insulating insertion part to be deformed into a shape that reduces the compression stress acting on the insulating insertion part when the insulating insertion part is compressed and receiving a resultant deformed portion, and the distal end of the insulating insertion part compressed by the compression force is deformed toward and received in the insulating recess.

6. The battery according to claim 2, wherein a hole inner peripheral surface defining the through hole of the case lid includes a hole tapered surface having a diameter increasing toward the upper surface of the case lid, before the insulating insertion part is compressed, the receiving space is formed between the hole tapered surface and the outer peripheral surface of the insulating insertion part to allow the insulating insertion part to be deformed into a shape that reduces the compression stress acting on the insulating insertion part when the insulating insertion part is compressed and receiving a resultant deformed portions, and a portion of the insulating insertion part compressed by the compression force is deformed toward and received in the receiving space.

7. The battery according to claim 2, wherein an outer peripheral surface of the insert-through part of the connecting member includes an insert-through recess recessed radially inward, the insert-through recess forms the receiving space allowing the insulating insertion part to be deformed into a shape that reduces the compression stress acting on the insulating insertion part when the insulating insertion part is compressed and receiving a resultant deformed portion, and a portion of the insulating insertion part compressed by the compression force is deformed toward and received in the insert-through recess.

8. The battery according to claim 2, wherein one of the first insulating member and the second insulating member, which does not include the insulating insertion part, has a facing surface that faces the distal end of the insulating insertion part in the axial direction, the facing surface including an insulating recess recessed in the axial direction before the insulating insertion part is compressed, before the insulating insertion part is compressed, the insulating recess forms the receiving space allowing the insulating insertion part to be deformed into a shape that reduces the compression stress acting on the insulating insertion part when the insulating insertion part is compressed and receiving a resultant deformed portion, and the distal end of the insulating insertion part compressed by the compression force is deformed toward and received in the insulating recess.

* * * * *